US008995923B2

(12) United States Patent
Jabara et al.

(10) Patent No.: US 8,995,923 B2
(45) Date of Patent: Mar. 31, 2015

(54) SYSTEM AND METHOD FOR MANAGEMENT OF A DYNAMIC NETWORK USING WIRELESS COMMUNICATION DEVICES

(75) Inventors: Gary B. Jabara, Irvine, CA (US); Christos Karmis, Irvine, CA (US); David Brett Simon, Agoura Hills, CA (US); Lloyd Frederick Linder, Agoura Hills, CA (US); Gharib Gharibjanians, Tustin, CA (US)

(73) Assignee: Mobilitie, LLC, Newport Beach, CA (US)

( * ) Notice: Subject to any disclaimer, the term of this patent is extended or adjusted under 35 U.S.C. 154(b) by 211 days.

(21) Appl. No.: 13/093,998

(22) Filed: Apr. 26, 2011

(65) Prior Publication Data
US 2011/0201275 A1 Aug. 18, 2011

Related U.S. Application Data

(63) Continuation-in-part of application No. 12/958,296, filed on Dec. 1, 2010, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,351.

(51) Int. Cl.
*H04W 4/08* (2009.01)
*H04W 84/18* (2009.01)
(Continued)

(52) U.S. Cl.
CPC ............. *H04L 12/5692* (2013.01); *H04W 4/08* (2013.01); *H04W 4/10* (2013.01); *H04W 8/186* (2013.01);
(Continued)

(58) Field of Classification Search
CPC . H04L 12/5692; H04L 67/10; H04L 67/1095; H04W 8/186; H04W 4/08; H04W 84/18; H04W 76/023; H04W 88/04; H04W 8/20
USPC ......................................................... 455/41.2
See application file for complete search history.

(56) References Cited

U.S. PATENT DOCUMENTS 6,477,353 B1 * 11/2002 Honda et al. ................. 455/11.1
7,305,212 B2 * 12/2007 Spratt .......................... 455/41.2
(Continued)

FOREIGN PATENT DOCUMENTS

KR       1020100038089 A    12/2010

OTHER PUBLICATIONS

Definition of word "periodic" retrieved from http://dictionary.reference.com/browse/Periodically+?s=t on May 27, 2014.*
(Continued)

*Primary Examiner* — Gennadiy Tsvey
(74) *Attorney, Agent, or Firm* — Michael J. Donohue; Davis Wright Tremaine LLP

(57) ABSTRACT

A short-range wireless communication network may be established by direct communication between two or more wireless communication devices. A conventional cellular telephone includes an integrated short-range transceiver. The short-range transceivers of multiple wireless communication devices can be coupled together to form a short-range communication network without utilizing any wireless communication network supported by wireless service providers. The short-range communication network may be extended as additional devices come within range or consolidated as wireless communication devices leave the communication range. The short-range communication network is built upon the proximity of wireless communication devices with each other. Data is disseminated between the wireless communication devices using a data message synchronization process. Messages may also be carried from one wireless network to another as the communication devices are carried by individuals.

31 Claims, 15 Drawing Sheets

(51) Int. Cl.
*H04W 88/04* (2009.01)
*H04L 12/54* (2013.01)
*H04W 8/18* (2009.01)
*H04W 76/02* (2009.01)
*H04W 4/10* (2009.01)
*H04W 8/20* (2009.01)
*H04W 76/00* (2009.01)
*H04L 29/08* (2006.01)

(52) U.S. Cl.
CPC ............ *H04W 8/205* (2013.01); *H04W 76/005* (2013.01); *H04W 76/023* (2013.01); *H04W 84/18* (2013.01); *H04W 88/04* (2013.01); *H04L 67/1095* (2013.01)
USPC ..................................................... 455/67.11

(56) References Cited

U.S. PATENT DOCUMENTS

| | | | | |
|---|---|---|---|---|
| 7,653,394 | B2* | 1/2010 | McMillin ...................... | 455/444 |
| 7,835,690 | B2* | 11/2010 | Burg et al. .................. | 455/11.1 |
| 7,994,942 | B2* | 8/2011 | Kim et al. ................ | 340/995.19 |
| 8,014,350 | B2* | 9/2011 | Touchard et al. ............ | 370/329 |
| 8,126,145 | B1* | 2/2012 | Tewari et al. ................ | 380/255 |
| 2001/0053669 | A1* | 12/2001 | Kado et al. ........................ | 455/7 |
| 2002/0163912 | A1* | 11/2002 | Carlson ......................... | 370/392 |
| 2004/0125776 | A1* | 7/2004 | Haugli et al. ................. | 370/338 |
| 2006/0068702 | A1* | 3/2006 | Miwa et al. .................. | 455/41.1 |
| 2006/0221915 | A1* | 10/2006 | Gatta et al. .................... | 370/338 |
| 2006/0227994 | A1* | 10/2006 | Godon et al. ................ | 382/100 |
| 2006/0271784 | A1* | 11/2006 | Bolosky et al. ............... | 713/170 |
| 2007/0217372 | A1* | 9/2007 | Gorday et al. ................ | 370/338 |
| 2008/0056215 | A1 | 3/2008 | Kopikare | |
| 2008/0130598 | A1* | 6/2008 | Kalhan ......................... | 370/338 |
| 2009/0016248 | A1 | 1/2009 | Li et al. | |
| 2009/0144377 | A1* | 6/2009 | Kim et al. ..................... | 709/206 |
| 2009/0213819 | A1 | 8/2009 | Kalhan | |
| 2009/0290520 | A1* | 11/2009 | Roberts et al. ................ | 370/311 |
| 2010/0061292 | A1* | 3/2010 | Weinstein ..................... | 370/315 |
| 2010/0120462 | A1* | 5/2010 | Mammarappallil et al. .. | 455/518 |
| 2010/0165875 | A1* | 7/2010 | Kneckt et al. ................ | 370/254 |
| 2010/0223347 | A1* | 9/2010 | Van Datta .................... | 709/206 |
| 2010/0296441 | A1* | 11/2010 | Barkan ......................... | 370/328 |
| 2011/0145314 | A1* | 6/2011 | Knize et al. .................. | 709/203 |

OTHER PUBLICATIONS

Korean Intellectual Property Offfice; International Search Report; Jul. 18, 2012; ISA/KR, 189 Cheongsa-ro, Seo-gu, Daejeon Metropolitan City, 302-701, Republic of Korea.

* cited by examiner

T:1300226090950 P:1 U:192.168.1.193 #:2 L: lat:34.12786325 lng: −118.72215927500001 M: 13Lloyd: hi T:1300226092168 P:1 U:192.168.1.9 #:2 L: lat:34.128018733333334 lng: −118.7220724 M: 10Robin: hi T:1300226109161 P:1 U:192.168.1.20 #:3 L: lat:0 lng: 0 M: 20Mobilitie: hi T:1300226138101 P:2 U:192.168.1.162 #:3 L: lat:34.128018733333334 lng: −118.7220724 D: 00Robin M: 12David: hi

FIG.6B

T:1300226138101 P:2 U:192.168.1.162 #:3 L: lat:34.128018733333334 lng: −118.7220724 D: 00Robin M: 12David * filename.ext packetnumber totalnumberofpackets filesize packetsize user*

FIG.6C

SYSTEM AND METHOD FOR MANAGEMENT OF A DYNAMIC NETWORK USING WIRELESS COMMUNICATION DEVICES

RELATED APPLICATIONS

This application is a continuation-in-part of U.S. application Ser. No. 12/958,296 filed on Dec. 1, 2010, which is a continuation-in-part of U.S. application Ser. No. 12/616,958 filed on Nov. 12, 2009, which is a continuation-in-part of U.S. application Ser. No. 12/397,225 filed on Mar. 3, 2009, the entire disclosures and content of which are hereby incorporated by reference in their entirety.

BACKGROUND OF THE INVENTION

1. Field of the Invention

The present invention is directed generally to wireless communication devices and, more particularly, to a system and method of network management to permit the dynamic formation of short-range communication networks using direct communication between wireless communication devices.

2. Description of the Related Art

Wireless communication networks have become commonplace. A vast array of base stations is provided by a number of different wireless service providers. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, modern wireless devices use digital signal protocols and have sufficient bandwidth to enable the transfer of voice signals, image data, and even video streaming. In addition, web-enabled devices provide network access, such as Internet access.

In all cases, the individual wireless communication devices communicate with one or more base stations. Even when two wireless communication devices are located a few feet from each other, there is no direct communication between the wireless devices. That is, the wireless devices communicate with each other via one or more base stations and other elements of the wireless communication network.

Some wireless service providers have included push-to-talk (PTT) technology that allows group members to communicate with each other using PTT technology. Thus, when one group member presses the PTT button, the communication from that individual is automatically transmitted to the communication devices of other group members. While this gives the appearance of direct communication between the wireless devices, the communications between group members are also relayed via one or more base stations as part of the wireless network.

Therefore, it can be appreciated that there is a need for wireless communication devices that can communicate directly with nearby wireless devices. The present invention provides this, and other advantages, as will be apparent from the following detailed description and accompanying figures.

BRIEF DESCRIPTION OF THE SEVERAL VIEWS OF THE DRAWING(S)

FIG. 6B illustrates one example of an individual message and message header and provides details of an exemplary embodiment of the message header.

FIG. 6C illustrates a packet message and header and provides details of the packet header.

DETAILED DESCRIPTION OF THE INVENTION

The system described herein extends the normal operational features of conventional wireless communication devices. As described above, the conventional wireless communication device communicates with a wireless communication network base station using a first transceiver (i.e., a network transceiver). The extended capabilities described herein provide a second transceiver device that allows wireless communication devices to communicate directly with each other over a short distance and further describes network management techniques capable of managing a dynamic network that may change quickly.

Figure 1:
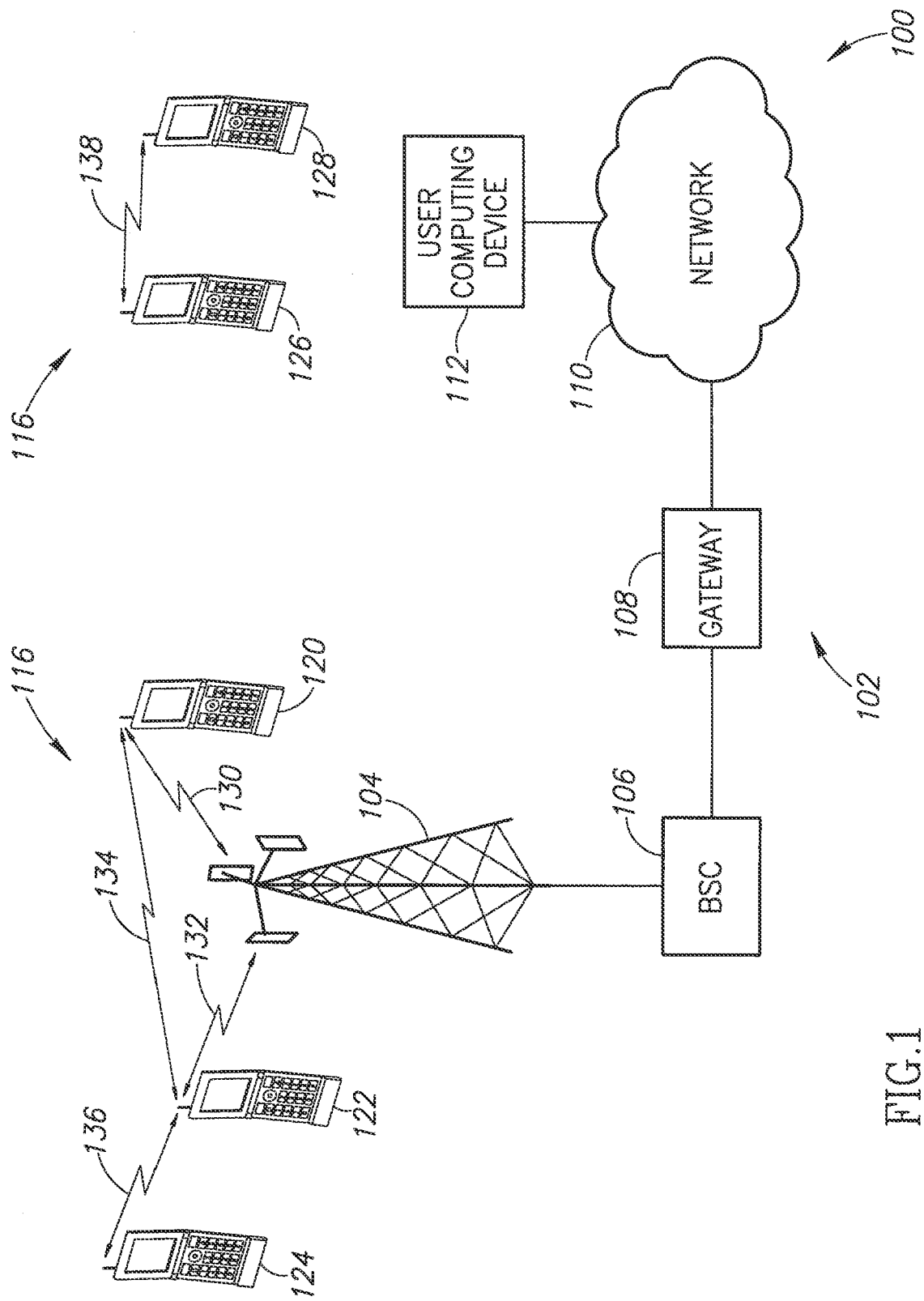
FIG. 1 is a diagram illustrating a system architecture configured to implement a communication system in accordance with the present teachings.

The wireless communication devices are illustrated as part of a system 100 illustrated in the system architecture in FIG. 1. Portions of the system 100 are conventional wireless network components that will be described briefly herein. The non-network communication capability, which may be referred to herein as a "jump-enabled" device or a "jump" device, will be described in greater detail below. The term "jump" refers to the ability of a wireless device designed and operated in accordance with the present teachings to jump from one short-range wireless network to another.

A conventional wireless communication network 102 includes a base station 104. Those skilled in the art will appreciate that the typical wireless communication network 102 will include a large number of base stations 104. However, for the sake of brevity and clarity in understanding the present invention, FIG. 1 illustrates only a single base station 104.

The base station 104 is coupled to a base station controller (BSC) 106. In turn, the BSC 106 is coupled to a gateway 108. The BSC 106 may also be coupled to a mobile switching center (not shown) or other conventional wireless communication network element. The gateway 108 provides access to a network 110. The network 110 may be a private core network of the wireless communication network 102 or may be a wide area public network, such as the Internet. In FIG. 1, a user computing device 112 is illustrated as coupled to the network 110.

For the sake of brevity, a number of conventional network components of the wireless communication network are omitted. The particular network components may vary depending on the implementation of the wireless communication network 102 (e.g., CDMA vs. GSM). However, these elements are known in the art and need not be described in greater detail herein.

Also illustrated in FIG. 1 are wireless communication devices 120-128. The wireless communication devices 120-128 are illustrative of many different types of conventional wireless communication devices capable of communicating with the base station 104 or other base stations (not shown) in the wireless communication network 102. Those skilled in the art will appreciate that the wireless communication network 102 may communicate using a variety of different signaling protocols. For example, the system 100 may be successfully implemented using, by way of example, CDMA, WCDMA, GSM, UMTS, 3G, 4G, LTE, and the like. The system 100 is not limited by any specific communication protocol for the wireless communication network 102.

As illustrated in FIG. 1, the wireless communication device 120 communicates with the base station 104 via a wireless network communication link 130. Similarly, the wireless communication device 122 communicates with the base station 104 via a wireless network communication link 132. Each of the wireless communication devices illustrated in FIG. 1 (e.g., the wireless communication devices 120-128) contain a conventional transmitter/receiver or transceiver components to permit conventional communication with the wireless communication network 102 via the base station 104 or other base station (not shown). Operational details of conventional network communication are known in the art and need not be described in greater detail herein.

In addition to the conventional network transceiver components, the jump-enabled wireless communication devices illustrated in FIG. 1 (e.g., the wireless communication devices 120-128) also include a second short-range transceiver to allow direct communication between the devices. This short-range communication is accomplished without reliance on the wireless communication network 102. Indeed, as will be described in greater detail below, the short-range transceivers in the mobile communication devices 120-128 permit the dynamic formation of a short-range communication network 116 that does not rely on the wireless communication network 102 provided by any wireless service provider. Thus, wireless communication devices can rely on the conventional wireless communication network 102 for some communications, but may also be part of the short-range communication network 116 formed between the mobile devices themselves. In the example of FIG. 1, the wireless communication device 120 communicates with the base station 104 via the wireless network communication link 130. Similarly, the wireless communication device 122 communicates with the base station 104 via the network wireless communication link 132. However, in addition, the wireless communication devices 120 and 122 may communicate directly with each other via a short-range communication link 134.

As illustrated in FIG. 1, the wireless communication device 124 is not in communication with the wireless communication network 102. However, the wireless communication device 124 can communicate directly with the wireless communication device 122 via a short-range wireless communication link 136. Also illustrated in FIG. 1 are the wireless communication devices 126-128. Although neither of these devices is in communication with the wireless communication network 102, the two devices are in direct communication with each other via a short-range wireless communication link 138. Thus, jump-enabled wireless communication devices must be in proximity with each other, but need not be in communication with the wireless communication network 102 or even in an area of wireless coverage provided by the wireless communication network.

The dynamic formation of one or more short-range networks 116 allows communication between the wireless communications devices 120-128 independent of the wireless communication network 102 even if the wireless communication network 102 is present and operational. The short-range communication network 116 advantageously allows communication in settings where the wireless communication network 102 is not present or in a situation where the wireless communication network is unavailable. For example, the wireless communication network 102 may be unavailable during a power outage or an emergency situation, such as a fire, civil emergency, or the like. In contrast, the short-range communication network 116 does not rely on any infrastructure, such as cell towers, base stations, and the like. As will be described in greater detail below, the short-range communication network 116 may be extended as jump-enabled wireless communication devices move throughout a geographic location.

Figure 2:
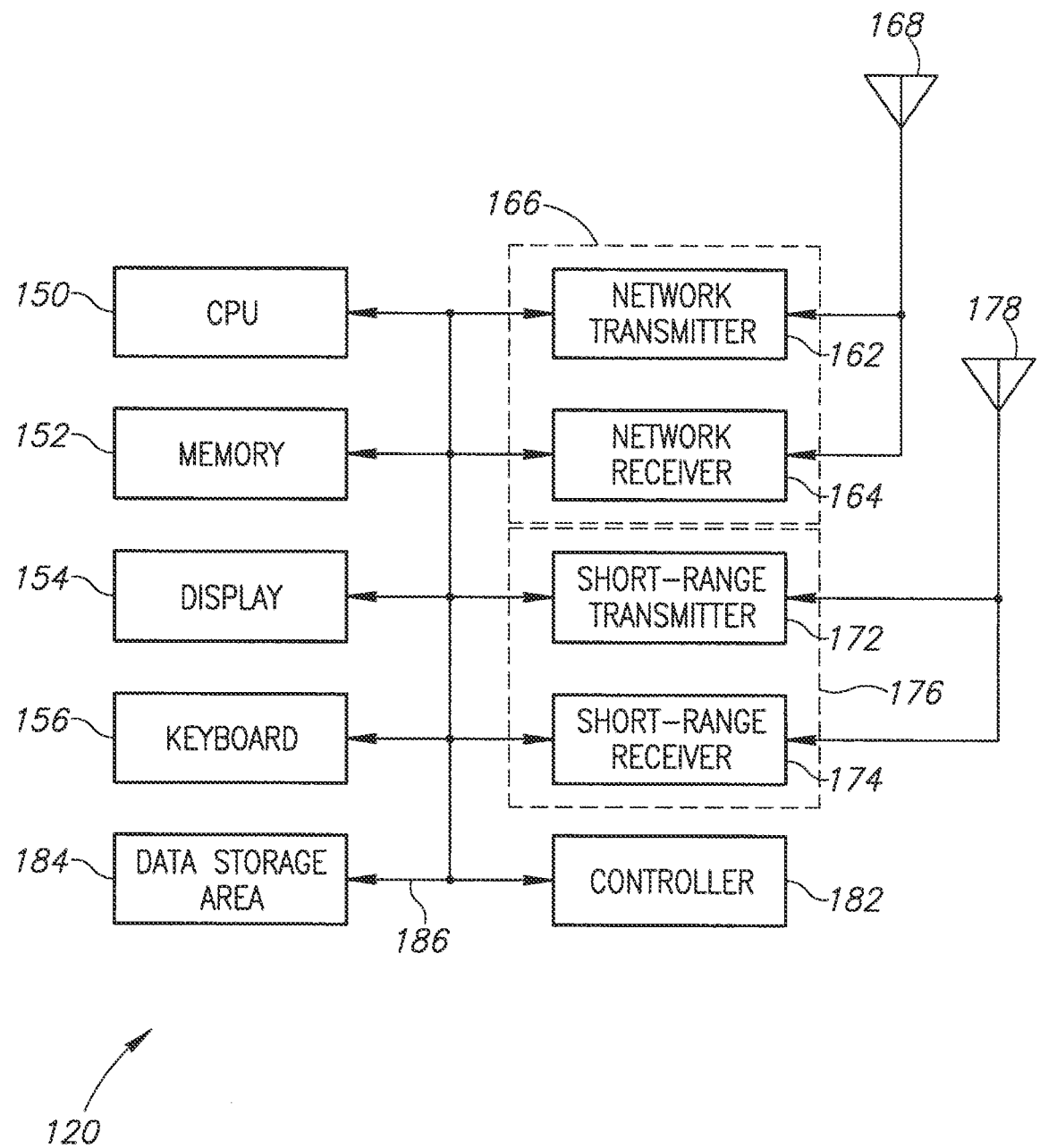
FIG. 2 is functional block diagram of one of the wireless communication devices of FIG. 1.

FIG. 2 is a functional block diagram illustrative of one of the wireless communication devices illustrated in FIG. 1 (e.g., the wireless communication device 120). The wireless communication device 120 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The wireless communication device 120 is not limited by the specific form of the CPU 150.

The wireless communication device 120 in FIG. 2 also contains a memory 152. In general, the memory 152 stores instructions and data to control operation of the CPU 150. The memory 152 may include random access memory, ready-only memory, programmable memory, flash memory, and the like. The wireless communication device 120 is not limited by any specific form of hardware used to implement the memory 152. The memory 152 may also be integrally formed in whole or in part with the CPU 150.

The wireless communication device 120 of FIG. 2 also includes conventional components, such as a display 154 and a keypad or keyboard 156. These are conventional components that operate in a known manner and need not be described in greater detail. Other conventional components found in wireless communication devices, such as a USB interface, Bluetooth interface, camera/video device, infrared device, and the like, may also be included in the wireless communication device 120. For the sake of clarity, these conventional elements are not illustrated in the functional block diagram of FIG. 2.

The wireless communication device 120 of FIG. 2 also includes a network transmitter 162 such as may be used by the wireless communication device 120 for the conventional wireless communication network with the base station 104 (see FIG. 1). FIG. 2 also illustrates a network receiver 164 that operates in conjunction with the network transmitter 162 to communicate with the base station 104. In a typical embodiment, the network transmitter 162 and network receiver 164 share circuitry and are implemented as a network transceiver 166. The network transceiver 166 is connected to an antenna 168. The network transceiver 166 is illustrated as a generic transceiver. As previously noted, the mobile communication devices (e.g., the mobile communication devices 120-128) may be implemented in accordance with any known wireless communication protocol including, but not limited to, CDMA, WCDMA, GSM, UMTS, 3G, 4G, WiMAX, LTE, or the like. Operation of the network transceiver 166 and the antenna 168 for communication with the wireless communication network 102 is well-known in the art and need not be described in greater detail herein.

The wireless communication device 120 of FIG. 2 also includes a short-range transmitter 172 that is used by the wireless communication device 120 for direct communication with other jump-enabled wireless communication devices (e.g., the wireless communication device 122 of FIG. 1). FIG. 2 also illustrates a short-range receiver 174 that operates in conjunction with the short-range transmitter 172 to communicate directly with other jump-enabled wireless communication devices (e.g., the wireless communication device 122 of FIG. 1). In a typical embodiment, the short-range transmitter 172 and short-range receiver 174 are implemented as a short-range transceiver 176. The short-range transceiver 176 is connected to an antenna 178. In an exemplary embodiment, the antennas 168 and 178 may have common components and are implemented as a single antenna.

FIG. 2 also illustrates a controller 182 and a data storage area 184. As will be described in detail below, the controller 182 controls the exchange of data between wireless communication devices that become part of the short-range communication network 116. The data storage 184 contains messaging data that will be exchanged between wireless communication devices in the short-range communication network 116. The data storage area 184 may be implemented as any convenient data structure. As will be described in greater detail below, the data storage area contains data (e.g., messages, personal profile information of contacts, a geographical location tag for each contact, and the like) that will be exchanged between wireless communication devices. The data may be stored as a simple list, part of a database, or any other convenient data storage structure. The data storage area 184 also stores a list of other nearby wireless communication devices that form part of the short-range wireless communication network 116.

The various components illustrated in FIG. 2 are coupled together by a bus system 186. The bus system may include an address bus, data bus, power bus, control bus, and the like. For the sake of convenience, the various busses in FIG. 2 are illustrated as the bus system 186.

In one embodiment, when the jump-enabled wireless communication device 120 comes within range of any other jump-enabled wireless communication device (e.g., the wireless communication device 122 of FIG. 1), it establishes a short-range wireless communication link (e.g., the short-range wireless communication link 134). In an alternative embodiment, the jump-enabled wireless communication device will establish a short-range communication network 116 with any nearby wireless communication device whether it is jump-enabled or not.

In an exemplary embodiment, the short-range transceiver 176 may be designed for operation in accordance with IEEE standard 802.11, sometimes referred to as WiFi. Many modern wireless communication devices are equipped with WiFi and may be readily upgraded to support the functionality described herein. Because the wireless communication devices 120-128 all include WiFi capability, short-range communication networks 116 may be formed even though the wireless communication devices may be designed to operate with incompatible wireless communication networks 102. For example, the wireless communication device 122 may be configured for operation with a GSM implementation of the wireless communication network 102. The wireless communication device 124 may be configured for operation with a CDMA implementation of a wireless communication network 102. Even though the wireless communication devices 122-124 are incompatible with respect to the respective wireless communication networks 102, the wireless communication devices 122-124 may still communicate directly with each other via the short-range communication network 116. Thus, the wireless communication devices 120-128 may operate compatibly to form the short-range communication networks 116 even though the network transceivers 166 (see FIG. 2) may operate with different incompatible wireless communication networks 102.

In one embodiment, a jump-enabled wireless communication device operates in an "ad hoc" mode defined by IEEE 802.11, which allows devices to operate in an independent basic service set (IBSS) network configuration. In this embodiment, one or more jump-enabled wireless communication devices (e.g., the wireless communication devices 120-128) communicate directly with each other in a peer-to-peer manner using unlicensed frequency bands. Manufacturer specifications for Wi-Fi devices may indicate that the wireless communication device Wi-Fi range is approximately 300 feet. Although the operational range of jump-enabled devices can be more or less than 300 feet, jump-enabled wireless communication devices are generally designed for short-range communication capability. In practice, the actual range may be considerably less, such as a 100 foot range. In addition, those skilled in the art will recognize that the actual transmission range may vary from one wireless communication device to another and may vary dramatically depending on obstructions. For example, natural obstructions (e.g., terrain or vegetation) or man-made obstructions (e.g., buildings or other structures) will have an impact on the range of the short-range transceiver 176. Furthermore, those skilled in the art will appreciate that the operational range of the short-range transceiver 176 will dynamically vary during operation. For example, the user may begin operation in one room of a building but move to a different room during operation of the short-range transceiver 176. Thus, the range and area of coverage of a wireless communication device can be highly variable.

In accordance with IEEE 802.11, two WiFi devices must be associated with each other to exchange data. This technique is well known in the use of personal computers where a WiFi connection may be established between a PC and a wireless router or wireless access point (WAP) at home, at the office, or some public location (e.g., an airport, coffee shop, and the like) that provides a wireless "hot spot." In this conventional operation, the user of the PC must enable a process to seek out any nearby WiFi wireless router or WAP. When one or more wireless routers are detected, the user manually selects a wireless router with which to communicate. In a setting such as an airport, the WAP is typically unencrypted and broadcasts an identification in the form of a service set identifier (SSID). For example, the SSID in the Los Angeles International Airport may, for example, be broadcast as "LAX Wireless Service."

In a home wireless network, the wireless router will also have an SSID (e.g., The Smith Family). In addition, a home wireless router may include known forms of encryption such as WEP, WPA-2, or the like. If encryption is selected, the wireless router will have an encryption key. For successful communication with an encrypted router, the PC user must select that router when viewing the list of available WiFi connections and provide the appropriate encryption key to match the encryption key for the selected wireless router.

As will be discussed in greater detail below, the system 100 goes beyond some of the conventional operation of WiFi standards to permit a large number of wireless communication devices to communicate directly with each other. In one embodiment, a local hot spot is used to initiate the formation of the short-range communication network 116. Once established, the short-range communication network 116 may continue to exist even if the hot spot (or group owner) is no longer present. In yet another alternative embodiment, described below, the wireless communication devices may be pre-programmed to utilize a common SSID, iprange, and port to spontaneously form a short-range communication network 116 even in the absence of any hot spot.

In an exemplary embodiment of the system 100, each wireless communication device (e.g., the wireless communication devices 120-128) transmits a beacon signal with the same SSID, such as the SSID "JUMMMP" to identify the device as a jump-enabled wireless communication device. In addition, the beacon frame includes several other data fields such as a media access layer (MAC) address for source and destination. In the beacon frame, the destination MAC address is set to all ones to force other wireless communication devices to receive and process the beacon frame. The beacon frame used in the system 100 may also include conventional elements, such as a time stamp used for synchronization with other wireless devices, information on supported data rates, parameter sets that indicate, for example, transceiver operational parameters such as the IEEE 802.11 channel number and signaling method such as operation at the physical layer (PHY) and operation in a direct frequency spectrum (DSSS) or a frequency hopping spread spectrum (FHSS) operational modes. These conventional WiFi parameters are known in the art and need not be described in greater detail herein.

In addition, since there is no access point, all jump-enabled wireless communication devices take on the responsibilities of the MAC layer that controls, manages, and maintains the communication between the jump-enabled wireless communication devices by coordinating access to the shared radio channel and the protocols that operate over the wireless medium. In an exemplary embodiment, the MAC is implemented in accordance with IEEE 802.2. At the PHY layer, the transceiver may operate in a DSSS or a FHSS operational mode. Alternatively, the PHY layer may be implemented using infrared transceivers. The IEEE 802.11 standard defines a common operation whether devices are using the ad hoc or the infrastructure mode. The use of the ad hoc mode only affects protocols, so there is no impact on the PHY layer. Thus, the wireless communication device 120 may operate under IEEE 802.11a at 5 gigahertz (GHz) under IEEE 802.11b/g at 2.4 GHz, or IEEE 802.11n, which operates at both 2.4 GHz and 5 GHz. Those skilled in the art will appreciate that the wireless communication device of the system 100 may be readily adapted for operation with future versions of IEEE 802.11.

In an alternative embodiment, the wireless communication devices 120-128 may be configured in accordance with IEEE WiFi Direct standards. WiFi Direct allows any wireless communication device in the short-range communication network 116 to function as the group owner. WiFi Direct simplifies the process of establishing a communication link. For example, the WiFi protected set up allows a communication link to be established by entering a PIN or other identification or, simply pressing a button. As will be described herein, the jump-enabled wireless communication devices actively seek to establish links with other jump-enabled devices to automatically establish a short-range communication network 116.

Figure 3:
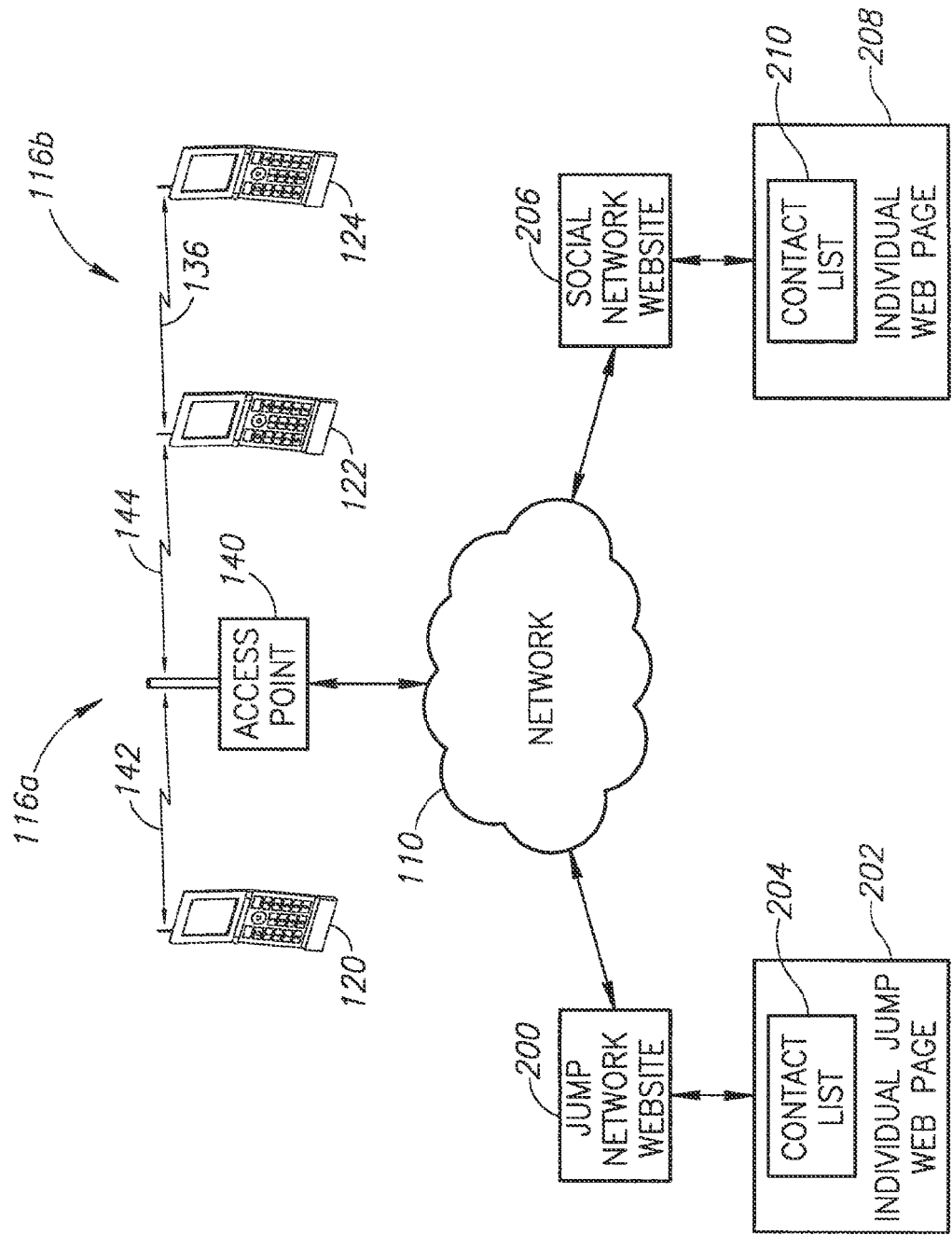
FIG. 3 illustrates an embodiment of the system of FIG. 1 using an access point as part of a network.

In yet another alternative embodiment, illustrated in FIG. 3, the jump-enabled wireless communication devices (e.g., the wireless communication devices 120-122) may communicate with an access point 140, such as a WiFi base station, WAP, wireless router, or the like. As will be described in greater detail below, a wireless communication device (e.g., on of the wireless communication devices 120-124) may function as the access point 140 to permit others of the wireless communication devices in the short range communication network 116 to access the network 110 via the wireless communication device serving as the access point. FIG. 3 illustrates a wireless communication link 142 established between the access point 140 and the wireless communication device 120. Similarly, the wireless communication device 122 establishes a wireless communication link 144 with the access point 140. Thus, a short-range communication network 116a is formed in conjunction with the access point 140. To assist in a better understanding of the present disclosure, short-range communication networks will be generally referred to by the reference 116. Specific examples of short-range communication networks will be referred to by the reference 116 and an alphabetic identifier (e.g., the short-range communication network 116a in FIG. 3).

Depending on the physical proximity of the wireless communication devices 120-124, there may be one or more short-range communication networks 116 formed. In the example of FIG. 3, the wireless communication devices 120-122 are both within range of the access point 140. Therefore, the first short-range communication network 116a can be formed with the wireless communication devices 120-122 and the access point 140.

The wireless communication device 124 is within range of the wireless communication device 122, but is not within range of the access point 140. In one embodiment, the wireless communication device 124 may become part of the short-range communication network 116a via the wireless communication device 122. In this embodiment, the wireless communication device 122 functions as a "repeater" or relay to relay information between the wireless communication device 124 and other parts of the short-range communication network 116a. In another embodiment, a second short-range communication network 116b is formed with the wireless communication devices 122-124. In this exemplary embodiment, the wireless communication device 122 is part of both short-range communication networks 116a-116b. The wireless communication device 122 may simultaneously be a member of both short-range communication networks 116a-116b or may be logically connected to both short-range communication networks 116a-116b by alternately switching between the short-range communication networks 116a-116b.

The access point 140 is coupled to the network 110 in a conventional manner. This can include a wired or wireless connection directly to the network 110 or via an intermediate network gateway, such as those provided by an Internet Service Provider (ISP). FIG. 3 also illustrates a JUMMMP Network website 200, which may support an individual web page 202 for each member (e.g., an individual person, business, organization, etc.) of the JUMMMP Network. FIG. 3 also illustrates a generic conventional social network website 206, which may support an individual web page 208 for each member of the social network. The JUMMMP network website 200 and social network website 206 are each coupled to the network 110. Although illustrated in FIG. 3 as two separate network websites, those skilled in the art will appreciate that the JUMMMP website 200 effectively functions as a social network website. Similarly, the JUMMMP website technology can be incorporated into existing social network websites. Thus, the two separate websites illustrated in FIG. 3 can effectively be combined into a single website.

As discussed in detail in co-pending U.S. application Ser. No. 12/616,958, filed on Nov. 12, 2009 and assigned to the assignee of the present application, the user of a jump-enabled wireless communication device (e.g., the wireless device 120) may use the web-browsing capability of the wireless communication device to access the individual jump web page 202 for the individual with whom contact has just been made to learn more about that individual. Alternatively, the user of a jump-enabled wireless communication device (e.g., the wireless device 120) may use the web-browsing capability of the wireless communication device to access the user's own individual jump web page 202 to store information for the individual with whom contact has just been made. A contact list 204, which is typically a portion of the individual jump web page 202 is configured to store contact information. Similarly, the individual jump web page 208 of the social network 206 can include a contact list 210 to store contact information. In one embodiment, the contact information may include a user profile exchanged along with individual messages between users. As will be discussed in greater detail below, the user profile can include user name and preferences, as well as information about the specific exchange of messages. For example, the user profile can include the date and time at which messages were exchanged, geo-location data (e.g., latitude and longitude) of the sender of a message, and the like, and can also be stored as user profile data in the contact list 204. Applications for the profile data are described in greater detail below.

The wireless communication devices 120-128 (see FIG. 1) generally have sufficient memory capacity to temporarily store contact information. In an exemplary embodiment, the wireless communication device (e.g., the wireless communication device 120) can temporarily store new contact information until access to the network 110 becomes available at a later time. In addition, the wireless communication device 120 can store designated contact information (e.g., "Favorites") on a more permanent basis. Long-term storage of contact information requires access to the network 110. In the embodiment of FIG. 1, access to the network 110 may be provided via the base station 104 in a conventional manner. The wireless communication device 122 may access the network 110 by communicating directly with the base station 104. In the embodiment of FIG. 3, access to the network 110 may be provided via the access point 140, as described above. For example, the wireless communication device 122 in FIG. 1 may access the network 110 by communicating directly with the access point 140 via the short-range communication link 144. Alternatively, the wireless communication device 122 can access the network 110 and the JUMMMP network website 200 via the wireless communication link 132 to the base station 104. Network access via the gateway 108 is well known in the art and need not be described in greater detail herein.

In an alternative embodiment, access to the network 110 may be provided via another jump-enabled wireless communication device. For example, in FIG. 1, the wireless communication device 122 can communicate with the base station 104 via the wireless communication link 132 while the wireless communication device 124 cannot communicate directly with the base station. However, the wireless communication device 124 is in proximity with the wireless communication device 122 and can communicate with the wireless communication device 122 via the wireless communication link 136 as part of the short-range communication network 116. In this embodiment, the wireless communication device 124 can use the wireless communication device 122 as a repeater or relay to allow the wireless communication device 122 to access the network 110 via the wireless communication device 122 and the base station 104.

Similarly, in the embodiment of FIG. 3, the wireless communication devices 120-122 can communicate directly with the access point 140 via the wireless communication links 142-144, respectively. The wireless communication devices 120-122 can also communicate with each other via the access point 140 thus forming the short-range communication network 116a. As seen in FIG. 3, the wireless communication device 124 cannot communicate directly with the access point 140. However, the wireless communication device 124 is in proximity with the wireless communication device 122 and can communicate with the network 110 via the wireless communication device 122 and the access point 140.

Figure 4:
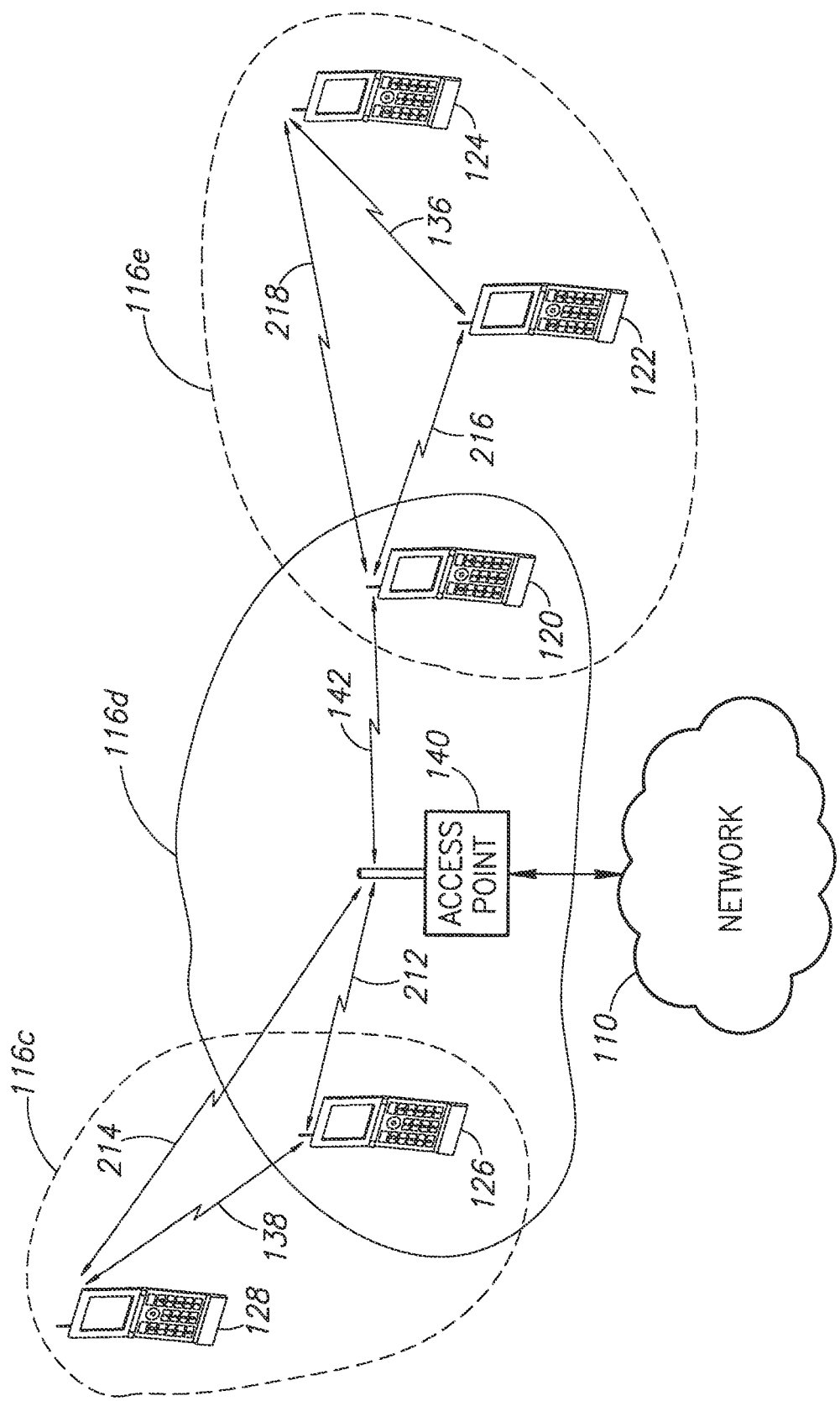
FIG. 4 illustrates a dynamic network topology using an access point.

As previously noted, the system 100 provides for the dynamic formation and rapid change in the topography of the short-range communication networks 116. For example, FIG. 1 illustrates a first short-range communication network 116 formed with the wireless communication devices 120-124 and a second short-range communication network 116 formed between the wireless communication devices 126-128. FIG. 4 illustrates the dynamic nature of the wireless communication networks 116. For example, if the wireless communication device 128 is initially within range of the wireless communication device 126, but out of range of the access point 140, the wireless communication devices 126-128 may form a short-range communication network 116c using the short-range communication link 138. If the wireless communication device 126 comes within range of the access point 140, a wireless communication link 212 is formed. In that event, the wireless communication device 126 may become part of a short-range communication network 116d formed between the access point 140 and the wireless communication devices 120 and 126. At this particular moment in time, the mobile communication device 126 may be part of both the short-range communication network 116c and the short-range communication network 116d. As discussed above, the wireless communication device 126 may actually be part of both the short-range communication networks 116c-116d or may logically be connected to both the short-range wireless communication networks by switching back and forth between the short-range communication networks 116c-116d. The logical switching between the short-range communication networks 116c-116d is transparent to the user. Other examples of the short-range communication network 116 are described below in which no access point 140 is present.

Alternatively, the wireless communication device 128 may become part of the short-range communication network 116*d* using the wireless communication device 126 as a relay to the access point 140. If, at a later time, the wireless communication device 128 comes within range of the access point 140, a wireless communication link 214 is formed therebetween. At that point in time, the short-range communication network 116*c* effectively ceases to exist since the wireless communication devices 126-128 are now part of the short-range communication network 116*d*.

The wireless communication device 120 may be part of the short-range communication network 116*d* by virtue of the short-range communication link 142 coupling the wireless communication device 120 to the access point 140. If the wireless communication device 120 comes within range of the wireless communication devices 122-124, wireless communication links 216-218 will be formed to couple the wireless communication devices 120-124 and thereby dynamically form a short-range communication network 116*e*. At this point in time, the wireless communication device 120 may simultaneously be part of the short-range communication network 116*d* and the short-range communication network 116*e*. Alternatively, the wireless communication devices 122-124 may become part of the short-range communication network 116*d* via the wireless communication device 120.

If the wireless communication device 120 subsequently moves out of range of the access point 140, the wireless communication link 142 is broken. Therefore, there will no longer be an overlap between the short-range communication networks 116*d*-116*e*. The wireless communication device 120 would remain part of the short-range communication network 116*e* so long as it remains within range of the wireless communication device 122, the wireless communication device 124, or both. Thus, those skilled in the art will appreciate that short-range communication networks are dynamically formed, modified, and dissolved as the wireless communication devices move in and out of range with each other and central points, such as the access point 140. Furthermore, if the wireless communication device 120 comes back into range of the access point 140, the wireless communication link 142 can be reestablished. When this happens, all prior communications from the short-range communication network 116*e* will be transferred to the short-range communication networks 116*d* and 116*c* (and visa-versa) through the re-echoing function described above. That is, the various wireless communication devices will resynchronize the data in the date storage area 184 (see FIG. 2). Those skilled in the art will also appreciate that the short-range communication networks 116 may be formed, modified, and dissolved without the presence of the access point 140.

FIG. 4 illustrates the wireless communication device 120 as a key component in the short-range communication network 116*e* because it connects the wireless communication devices 122-124 to the access point 140. If the wireless communication device 120 suddenly moved out of range of the access point and/or the wireless communication devices 122-124 that connection may be broken. Similarly, if the user of the wireless communication device 120 suddenly turned off the device, the link between the short-range communication network 116*e* and the access point 140 would disappear. The wireless communication devices 122-124 still communicate with each other via the wireless communication link 136 and will still search for other wireless communication devices with which to connect. In addition, either of the wireless communication devices 122-124 will attempt to find the access point 140 or a hot spot from which either of the wireless communication devices may access the network 110.

FIG. 4 illustrates a sparse network with only five wireless communication devices. However, those skilled in the art can appreciate that there may be a very large number of wireless communication devices in proximity with each other. For example, if FIG. 4 is illustrative of a large shopping mall, there may be hundreds of wireless communication devices within the mall. Thus, the short-range communication networks 116 may be large and extensive. There may be a large number of wireless communication devices that are simultaneously present in two or more short-range communication networks 116. In addition, many wireless communication devices would provide overlapping coverage with multiple short-range communication networks 116. In this scenario, the entire mall and surrounding parking area could be effectively covered by a mesh network comprising dozens or hundreds of short-range communication networks 116. Thus, in the situation illustrated in FIG. 4 where the wireless communication device 120 is turned off or moved out of range of other wireless communication devices is less likely to cause the total isolation of the short-range communication network 116*e*. If the wireless communication device 120 were suddenly removed, either by powering down or by the departure from the area, many other wireless communication devices (not shown) in the same proximity would be able to replace the connectivity between the short-range communication network 116*e* and the access point 140.

Figure 5:
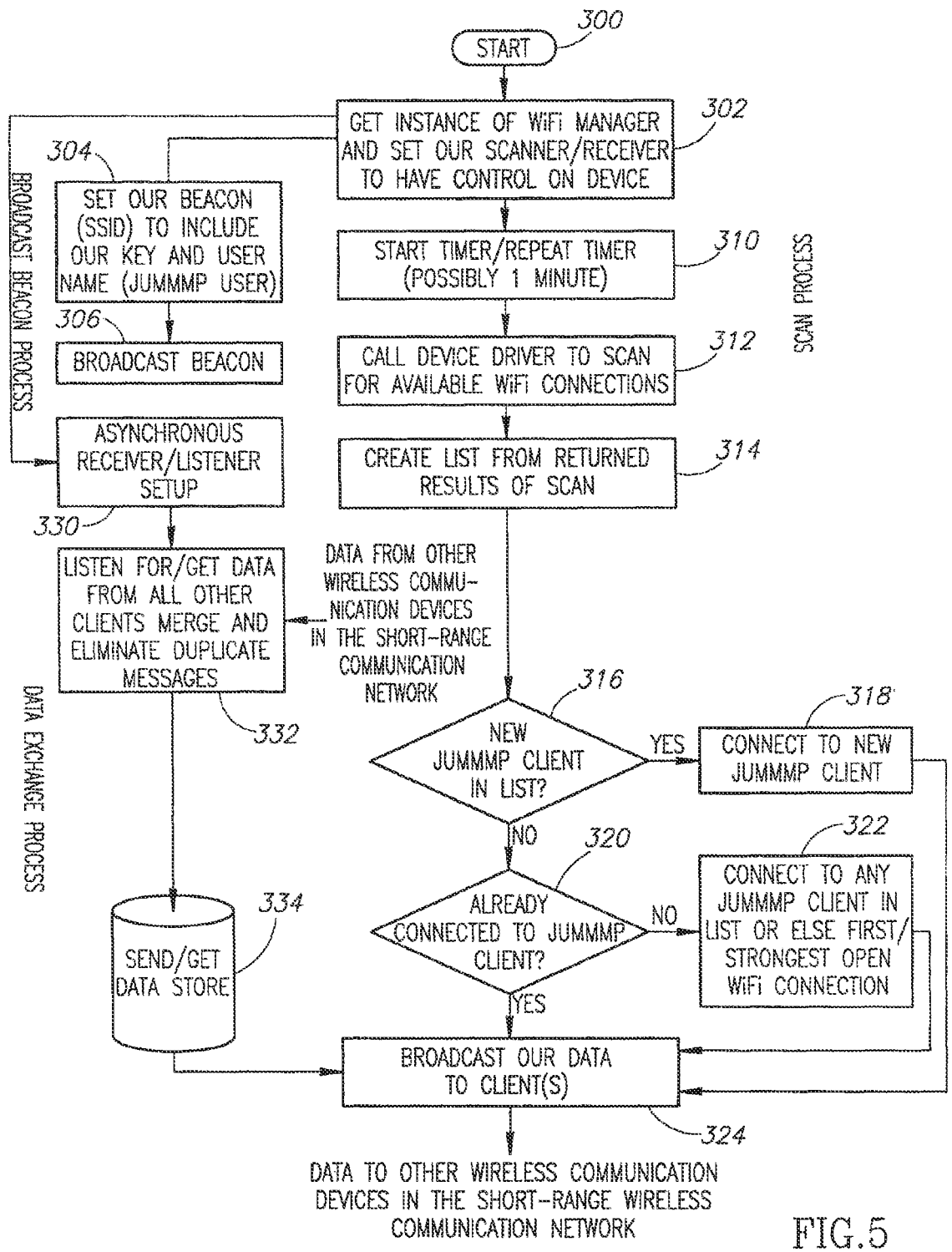
FIG. 5 is a flow chart illustrating the operation of an application program interface to implement the short-range wireless communication network.

FIG. 5 illustrates a flow chart and functionality of an application program interface (API) utilized by jump-enabled wireless communication devices. The JUMMMP API may be programmed into the wireless communication device at the time of manufacture or downloaded in a conventional manner. The JUMMMP allows a wireless communication device with a short-range transceiver 176 (see FIG. 2) to function as a jump-enabled device. Those skilled in the art will understand the programming steps to download and install the JUMMMP API. The controller 182 (see FIG. 2) in the wireless communication device (i.e., the wireless communication device 120) executed the JUMMMP API. As previously noted, the controller 182 may be implemented as a set of instructions stored in the memory 152 and executed by the CPU 150.

At a start 300, shown in FIG. 5, the JUMMMP API is already present within the various wireless communication devices. FIG. 5 illustrates a number of processes that are performed by the JUMMMP API, including a Broadcast Beacon Process, a Scan Process, and a Data Exchange Process. The separate processes may be executed repeatedly by the wireless communication device.

At step 302, the wireless communication device enables an instance of a WiFi Manager that controls the WiFi communication hardware (i.e., the short-range transceiver 176 of FIG. 2) and sets the JUMMMP API to have control of the short-range transceiver. The three processes listed above all require the operation of step 302 such that the JUMMMP API gains control of the short-range transceiver 176. Any wireless communication device that includes a WiFi transceiver will include some control functionality, labeled herein as the WiFi Manager to control the WiFi communication transceivers using one or more software drivers that control the actual hardware. With the installation of the JUMMMP API, the wireless communication device 120 may hook into the existing WiFi Manager and utilize some of the WiFi Manager functionality. Certain functions, such as the Scan Process, may be controlled to a greater degree by the JUMMMP API.

The Broadcast Beacon Process is initiated to inform wireless devices of the presence of a jump-enabled wireless communication device. In step 304, the beacon signal of the jump-enabled wireless communication device is altered such that the SSID will contain a key word identifying the wireless communication device as part of a jump network (e.g., SSID=JUMMMPNet). Those skilled in the art will appreciate that IEEE802.11 provides for user-specified data to be broadcast as part of the beacon signal. In a current implementation of IEEE802.11, a total of 32 characters are available for user-defined purposes. In step 304, the beacon signal is also altered to include a local user name and may, optionally, include a unique alphanumeric identifier and additional flags that may be used for applications utilizing the JUMMMP API. Application programs can use the JUMMMP API to insert application-specific data into the beacon signal. For example, a social networking application program can use the JUMMMP API to insert information such as age, sex, and interests of the user that will be broadcast in the beacon signal and used by other wireless communication devices running the social networking application program. In another example, a sports application program can insert sports scores or updates into the beacon signal. If there are too many scores to fit into the allocated space in a single beacon signal, the scores can be changed with each beacon signal.

In step 306, the wireless communication device 120 periodically transmits the beacon signal. The beacon signal may be set to broadcast continuously or at a predetermined interval, such as, by way of example, every ten seconds. Those skilled in the art will appreciate that the interval used to broadcast the beacon signal may be altered based on system metrics. The beacon broadcast process ends at step 306 with the short-range transceiver 176 continuing to broadcast the beacon signal.

While the jump-enabled wireless communication device 120 is broadcasting its own beacon signal, it also listens for the beacon signals broadcast from other jump-enabled wireless communication devices (e.g., the wireless communication device 122). The Scan Process illustrated in FIG. 5 outlines the actions of the JUMMMP API to detect and communicate with other jump-enabled devices. In the Scan Process, illustrated in FIG. 5, a timer is started in step 310. As discussed above, step 302 has already been performed to permit the JUMMMP API to gain control of the WiFi Manager. The timer process in step 310 determines how frequently a jump-enabled wireless communication device 120 will scan for other jump-enabled wireless communication devices.

In step 312, the JUMMMP API controls the WiFi Manager to activate a device driver in the wireless communication device to scan for available WiFi connections. In step 314, the jump-enabled wireless communication device creates a list of results returned from the scan in step 312. The list of results may be stored in the data storage area 184 (see FIG. 2). It should be noted that this list may include non-jump-enabled wireless communication devices as well as jump-enabled wireless communication devices.

In decision 316, the controller 182 (see FIG. 2) in the jump-enabled wireless communication device 120 determines whether any new jump-enabled wireless communication devices are present on the list. Those skilled in the art will appreciate that the wireless communication device performing the scan process may be designated as the group owner while any detected wireless communication devices (whether or not they are jump-enabled devices) may be designated as client devices. As previously discussed, in many WiFi modes of operation, one wireless device must be designated as the group owner while others of the wireless communication devices are designated as client devices. Those skilled in the art will appreciate that the Scan Process (see FIG. 5) is not limited only to the group owner. In an exemplary embodiment, all jump-enabled wireless communication devices perform a Scan Process in an effort to discover and connect with other wireless communication devices. Furthermore, while there may be a preference to connect with other jump-enable wireless communication devices, the Scan Process will discover any nearby wireless communication device, whether or not it is jump-enabled, and may connect to any nearby wireless communication device, whether or not it is jump-enabled.

If there are new jump-enabled wireless communication devices in the list, the result of decision 316 is YES and, in step 318, the wireless communication device 120 connects to the new jump client device.

If there are no new jump devices detected as a result of the scan in step 312, the result of decision 316 is NO and, in decision 320, the wireless communication device 120 determines whether it is already connected to another jump-enabled client device. If the wireless communication device is not already connected to a jump-enabled client device, the result of decision is NO and, in step 322, the jump-enabled wireless communication device will attempt to connect to any jump client device in the list (created in step 314) or else attempt to establish a connection with the first open WiFi connection from the list created in step 314. Alternatively, the jump-enabled wireless communication device may attempt to connect to the open WiFi connection having the strongest signal in step 322.

If the wireless communication device is already connected to a jump client, the result of decision 320 is YES. If the wireless communication device has connected to a new jump client in step 318, or connected to a WiFi device in step 322, or is already connected to a jump client device from decision 320, the wireless communication device 120 broadcasts stored data to any client device(s) to which it is able to connect in step 324. As will be described in greater detail below, the system 100 is capable of distributing messages throughout a short-range communication network 116 and may even distribute messages from one short-range communication network to another.

FIG. 5 also illustrates a message exchange process to facilitate the exchange of data between wireless communication devices in a particular short-range communication network 116 (e.g., the short-range wireless communication device 116e of FIG. 4). The data exchange process in the JUMMMP API is also illustrated in FIG. 5. As with other processes illustrated in FIG. 5, the JUMMMP API begins with step 302 in which the WiFi manager is instantiated and the controller 182 (see FIG. 2) has control of the short-range transceiver 176. In step 330, the controller 182 configures the short-range receiver 174 to detect transmitted beacon signals from other jump-enabled wireless communication devices. The wireless communication device 120 has stored messages previously received from other clients and stored the received messages in the data storage area 184 (see FIG. 2). In step 332, the wireless communication device listens for and gets data from all other jump-enabled clients. In step 332, the controller 182 also merges the messages received from other clients in step 332 and stored in the data storage area 184 as well as newly received messages in order to merge the messages and eliminate duplicate messages. In this manner, the wireless communication device manages the message data within the data storage area 184. Further details of message management will be provided below.

In step 334 the controller 182 stores the merged message data in the data storage area 184 and in step 324, the merged message data is broadcast to other clients' jump-enabled wireless communication devices that form part of the short-range communication network 116. Thus, when two jump-enabled wireless communication devices detect each other and form a short-range communication network 116, the wireless communication devices exchange message data with each other such that the message data is synchronized between the two devices. If a third wireless communication device joins the short-range communication network 116, its message data is exchanged between the two wireless communication devices that have already formed the network. Thus, the wireless communication devices within a particular short-range communication network 116 are effectively synchronized with the respective message data.

As will be described in greater detail below, the message data exchanged between wireless communication devices in the short-range communication network 116 may include a main header as well as a list of individual messages that may be intended for users of the wireless communication devices within the particular short-range communication network as well as messages for other jump-enabled wireless communication devices that are not part of the particular short-range communication network. Messages to be exchanged between wireless communication devices in a short-range communication network 116 may be categorized based on the nature of the message. In an exemplary embodiment, messages may be categorized as Public Messages, Group Messages, Direct Messages, and Status Messages. Public Messages may be transmitted to anyone within range of the wireless communication device (e.g., the wireless communication device 120). This may include emergency messages, messages broadcast from a retailer, and the like. Group Messages are intended for a specific group or organization, such as a scout troop or employees of a particular company or part of any formed group. Direct Messages are intended for a specific individual. In addition, the wireless communication device 120 may transmit Status Messages, which can include, by way of example, a list of other wireless devices currently in the particular short-range communication network 116, a list of recent wireless communication devices in the particular short-range communication network, a list of other short-range communication networks in which the wireless communication device 120 was recently a member, or the like. The data exchange process illustrated in FIG. 5 can include one or more of these message categories. Other message categories may be created as necessary.

Figure 6A:
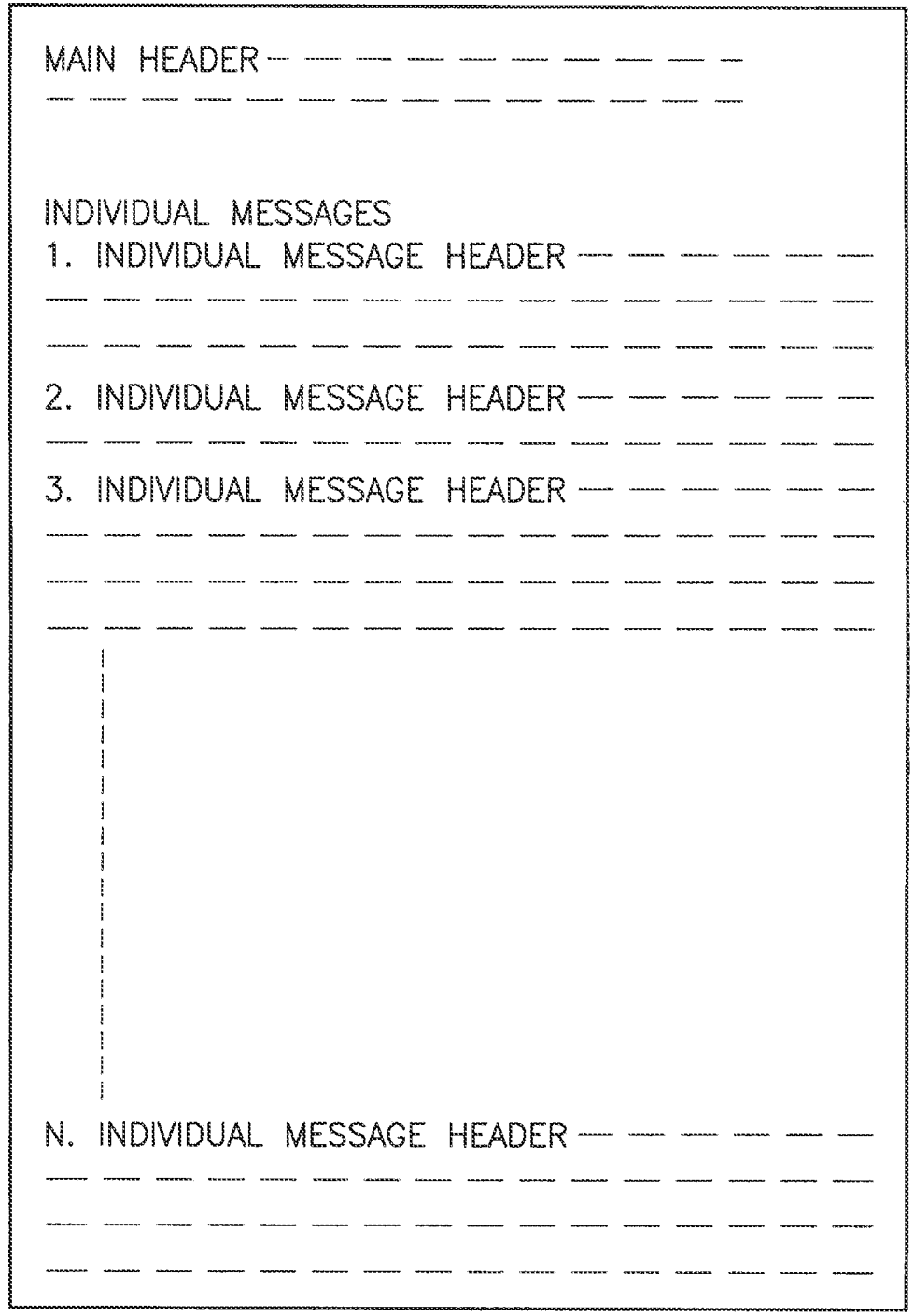
FIG. 6A is one example of message storage within a wireless communication device of the system of FIG. 1.

In one embodiment, all public messages and group messages may be contained in one file and all direct messages contained in a separate file. The messages may be formatted as standard text files or xml files that have a main header and individual message headers, as illustrated in FIG. 6A.

The main header for all messages may contain at least the following:
1. Date/time of last modification;
2. Message count;
3. Last synch date/time and user name of the wireless communication device with which the last synchronization was performed; and
4. Our local user name.

This main header can help maintain synchronization between the wireless communication devices without excess exchange of data or unnecessary processing by any of the wireless communication devices. For example, the last synch date/time may indicate that a recent synchronization has occurred and that another synchronization is unnecessary at the present time.

Alternatively, synchronization data may be provided in the form of a data flag in a status byte of the beacon signal. As previously noted, the beacon signal permits the transmission of a limited amount of user-defined data. A status data byte may contain one or more data flags. One data flag may be a New_Data flag to indicate that a particular wireless communication device (e.g., the wireless communication device 120) has new data. The wireless communication device 120 may synchronize its message data with other wireless communication devices within the particular short-range communication network 116. Following the synchronization, the New_Data flag may be reset.

Those skilled in the art will appreciate that other conventional data synchronization techniques may be used. For example, the wireless communication devices within a particular short-range communication device 116 may simply synchronize with each other on a periodic basis. For example, the wireless communication devices within a particular short-range communication network 116 may synchronize every ten minutes or some other selected time period. The re-synchronization period may be dynamically altered based on factors such as the number of wireless communication devices within a particular short-range communication network 116. Furthermore, the addition of a new wireless communication device into the particular short-range network 116 may force a re-synchronization process even if the time period has not yet expired for the other ones of the wireless communication devices.

In addition to the text message itself, individual message headers will contain at least the following:
1. Date/time stamp of message creation;
2. User name that created the message (i.e., originator);
3. Destination user name/group name/global for direct messages/group messages/public messages; and
4. Urgency level.

FIG. 6B illustrates several example messages and message headers. The "T" information is a time stamp using standard computer time format. The "P" information indicates the message designation as a public (P:1) or private (P:2) message or may include profile information (P:0) regarding the sender's personal information, education, hobbies and interests, and the like. Other profile information has been previously discussed. The "U" information is the IP address of the message sender. To provide more reliable sender information, a unique code such as the IMEI of the sender telephone could be included. The "L" information is the longitude and latitude of the message sender. The "M" information is the username of the sender of the message. The "D" information is the identification of the recipient of a private message (i.e., P:2). The username must be unique for each user. A username could, for example, include the user's mobile phone number.

The geo-location data (e.g. longitude and latitude) can be obtained in several possible ways. In one embodiment, the wireless communication device (e.g., the first wireless communication device 120 in FIG. 1) may have built-in GPS. Other possible location determination technologies include WiFi, 3G, approximate triangulation, or last known location of the user. Other known location technologies may also be implemented in the system 100.

In one embodiment, previously discussed, contact information may be stored in the data storage area 184 (see FIG. 2) of the wireless communication device and periodically uploaded to the contact list 204 (see FIG. 3) for the individual JUMMMP webpage when access to the network 110 is available. In an alternative embodiment, the data storage area 184 may store a list of all text messages received, such as those illustrated in the example of FIG. 6B. The text message data in FIG. 6B can be stored in any convenient format, such as a table, database, or the like. Other data structures known in the art may also be satisfactorily employed to store the text message data. Those skilled in the art will appreciate that the storage capacity of the wireless communication device is sometimes limited. Accordingly, when access to the network 110 becomes available, the wireless communication device may upload the text message to the individual JUMMMP webpage 202 or to another computer designated by the user. This data storage structure contains all of the information of text messages sent or received by the wireless communication device during some prior period of time. This includes information regarding personal profiles that may have been received during encounters with other individuals. The personal profile information can include an email address, or other contact information that was received as part of text messages. In addition, there are geo-location data tags for each text message. Using known technology, the geo-location data can be used to pinpoint the location of an individual on a map. This collection of data may be mined and used in a number of personal or business applications. For example, the geo-location information can be used to determine a person's personal shopping preferences. The data can be collected by a business and located on a computer for each store location. Under circumstances where network connectivity is unavailable, such as during an emergency or power outage situation, or when the wireless communication device is out of range of any network access point, the data storage area 184 within the wireless communication device itself maintains the integrity of the data messaging received and thus provides data storage capability not located in the Internet. This "outernet" connectivity can be independently maintained by each wireless communication device.

In addition to the text messaging described above, the wireless communication devices (e.g., the first wireless communication device 120 in FIG. 1) can provide other forms of data. For example, a data file may be packetized and sent in a manner similar to that used for text messaging described above. FIG. 6C illustrates an example data header for non-text message data. For example, the data file could be audio data or any binary data file, such as images (e.g., an image captured by an in-phone camera), documents, video, and the like. Images could be in the form of a JPEG, PDF, or known image file formats. Documents could be in the form of word processor documents, such as Microsoft Word. Video data files can be in any known format, such as MPEG.

As with text messages, data files can be private or public. That is, a data file can be private and intended for only a specified recipient or a designated group of recipients. Alternatively, the data file may be broadcast publicly to any nearby recipient. Application programs in the wireless communication device of the intended recipient can process the data files. For example, audio and/or video CODECS in the wireless communication device can process audio and video data files. Below the application layer, security measures can prevent unauthorized recipients of data files (or text messages) from accessing those messages. In addition, text messages or data files may be encrypted prior to transmission to prevent unauthorized interception of the message data.

As described above with respect to FIG. 6A, text message data is exchanged between nearby wireless communication devices. Each wireless communication device examines message data in the data storage area 184 (see FIG. 2) to eliminate duplicate messages. Whenever the wireless communication devices exchange messages, they exchange all messages in the data storage area 184.

Those skilled in the art will appreciate that non-text messages, such as audio data, video data or image data, are generally much larger in size than a text message. In one embodiment, the system 100 can treat non-text data messages in the same manner as text messages. That is, each wireless device may send all data in the data storage area 184 (see FIG. 2) every time it exchanges messages with other nearby wireless communication devices.

In an alternative embodiment, non-text message data may be treated differently. In this embodiment, as a data packet is sent from one wireless communication device to all nearby wireless communications devices, each of the receiving wireless communication devices will transmit the received data packet only once. If the data packet has been received before it will be ignored by the receiving wireless communication device.

In yet another embodiment, each wireless communication device that receives the data packets for a particular data message will store those data packets to reassemble the original message. In this aspect, each nearby wireless communication device will receive most or all of the data packets for a particular data message. If the intended recipient of a data message does not receive all of the data packets for the particular message, it can broadcast a request for those missing packets. In this manner, the nearby wireless communication devices may act as "servers" to store and relay data packets in response to the request for missing data packets. If the intended recipient is missing a larger number of packets, it can simply request retransmission of the entire data file. Any nearby wireless communication devices having data packets for the particular message can transmit those data packets thereby permitting the intended recipient to receive and reassemble the entire data message.

If the data message is an audio transmission, the wireless communication device 120 can be programmed to have a Push-to-Talk (PTT) button. For example, many "smart phones" have touch sensitive screens. A PTT button could be programmed into the touch sensitive screen. When a user presses the PTT button, an audio message is recorded and stored within the wireless communication device. When the PTT button is released, the audio message is transmitted to other nearby wireless communication devices. The audio message may be a private message for a particular recipient, a group message for a designated group of recipients, or a public message intended for any nearby recipient.

In another embodiment, a retail business may broadcast messages to nearby wireless communication devices. In an exemplary embodiment, the retail facility can set up a wireless access point (e.g., the wireless access point 140 in FIG. 3) to establish a short-range communication network 116. For example, a retail facility in a shopping mall can transmit advertisement messages to nearby wireless communication devices. In a typical embodiment, these would be public messages that are freely relayed from one wireless communication device to another and from one short-range wireless communication network 116 to another. Using this form of message distribution, an advertisement from a retail facility will soon be disseminated to all wireless users in the area. The advertisements may take the form of text messages or any other data message described above.

In another aspect, an individual user may register with a business. Whenever the user comes within range of the short-range communication network 116 associated with the retail business, message data may be exchanged thus enabling the business to identify a particular user that is nearby. In this embodiment, the retail business may send a private advertisement message to the particular user. The private advertisement may be customized for the user based on a number of factors, such as the user's profile (e.g., the sex, age, and interests of the user), prior shopping patterns, or the like. It can also be based on statistical and history data that the retail business has collected on the user in one or more short-range communication networks 116 in the region around the retail business. For example, if a particular user has registered with a restaurant and comes within range of the short-range communication network 116 of that restaurant at a subsequent time after registration, the restaurant can send a private advertisement message to entice that user into the restaurant by offering a discount on a meal previously purchased by that user. If the user is a sports enthusiast, a sports bar could send a message that a particular sporting event (e.g., the user's college football team) is ongoing and offer a discount on a meal. In this manner, highly customized advertisements may be sent to individual users.

In some situations, the user may not be within range of the short-range communication network 116 of the restaurant, but may still be nearby. Because the wireless communication devices in the various short-range communication networks 116 relay messages, any message from a particular user may be relayed to the retail business via one or more short-range communication networks 116. Thus, a business at one end of a mall may detect the arrival of a particular user at the opposite end of the mall and still transmit a customized advertisement message to that user.

As discussed above with respect to FIG. 6B, a text message may include time data and geo-location data (e.g., latitude and longitude). In yet another aspect of the system 100, a business can collect and analyze the time and geo-location data to identify patterns among users even if the user has not previously registered with the business. The business can also collect profile data transmitted by the user. The data in a text message header uniquely identifies an individual even if that individual's actual identity is unknown to the business. A business can collect data and determine, for example, that a particular user passes nearby the business every day in a particular time range. The business can broadcast a public advertisement or a private advertisement to that unknown individual based on the time and geo-location data pattern previously established. For example, a coffee shop may determine that a particular user passes by every Monday-Friday between 9:00 and 9:30 a.m. With this data in hand, the coffee shop can broadcast an advertisement message to the particular unidentified individual to invite them into the business. In one aspect of this embodiment, the business can collect and store identification data, time data, and geo-location data on an ongoing basis.

Because of the mobile nature of the wireless communication devices, any particular wireless communication device can be present in one or more short-range communication networks 116 and may readily leave one short-range wireless communication device and readily join another short-range wireless communication device.

FIGS. 7-12 illustrate the distribution of message data throughout multiple short-range communication networks 116. For the sake of simplicity, the wireless communication devices are illustrated in these figures merely as dots with associated reference numbers. Furthermore, the area of coverage of wireless communication devices may be illustrated as a circle in FIGS. 7-12. Those skilled in the art will appreciate that the circle is a two-dimensional representation of the area of coverage of a particular wireless communication device. Those skilled in the art will appreciate that the wireless communication device transmits in three-dimensions and that the arc of coverage may be altered by natural or manmade barriers (e.g., terrain, plants, trees, walls, buildings, and the like). The area of coverage may even alter as the wireless communication device moves from one room to another within a building.

Figure 7:
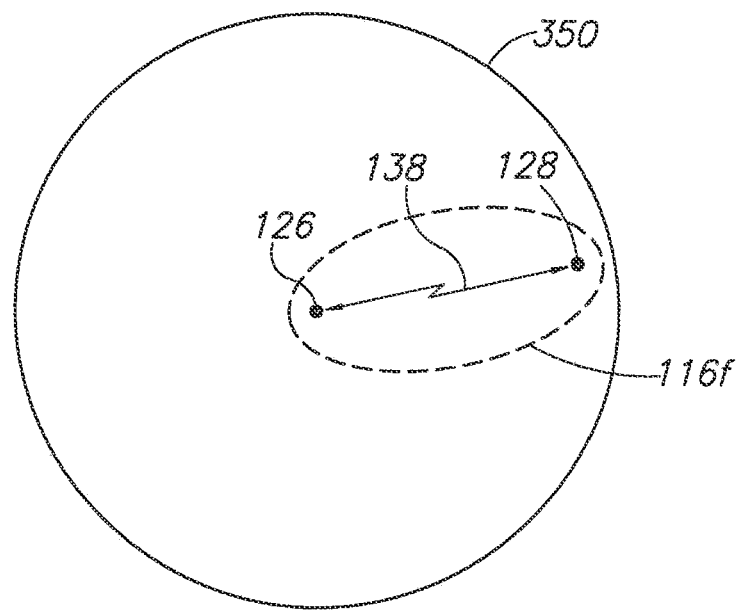
FIG. 7 illustrates the creation of a short-range communication network between two wireless communication devices.

FIG. 7 illustrates the most rudimentary form of the short-range communication network 116. In FIG. 7, the wireless communication device 126 is illustrated at the center of a communication range 350. Wireless communication devices that come within the communication range 350 may form a short-range communication network 116f. As the wireless communication device 128 moves within range of the wireless communication device 126, the wireless communication link 138 is established. As described above, the two wireless communication devices 126-128 will exchange message data. In one embodiment, each of the wireless communication devices 126-128 could exchange its complete list of message data stored within the data storage area 184. In some embodiments, only one of the mobile communication devices 126-128 transmits its message data to the other wireless communication device. The receiving wireless communication device compares the received message data with the message data stored in the data storage area 184 to eliminate duplicate messages. Duplicate messages may be identified by the individual message header that identifies the originator as well as the date/time of the message origination. In practice, either of the two wireless communication devices 126-128 could send its stored message data. To avoid inconsistencies, in one embodiment, the group owner (the wireless communication device 126 in the example of FIG. 7) is designated to receive the message data and perform the merge operation. Thus, in this example the wireless communication device 128 would transmit all of the stored message data in the data storage area 184. As discussed above with respect to FIG. 5, this may also include new messages created by the wireless communication device 128. Upon receipt, the wireless communication device 126 compares the received messages with the stored messages in the data storage area 184 to eliminate duplicates. Time stamp data, discussed above with respect to FIG. 6, can be used to identify duplicate messages. Following the message merge process, the data storage area 184 in the wireless communication device 126 will contain a merged data message file. The merged data message file is transmitted to the wireless communication device 128 for storage in its data storage area 184. Thus, the data storage area 184 in each of the wireless communication devices 126-128 is now synchronized. This illustrates a Data Exchange Process (see FIG. 5) to synchronize the data storage areas 184 between two wireless communication devices in a particular short-range communication network 116. If the short-range communication network 116 includes more wireless communication devices, they will undergo the Data Exchange Process such that all wireless communication devices in a particular short-range communication network are synchronized (i.e., they have the same data in their respective data storage areas 184).

Figure 8:
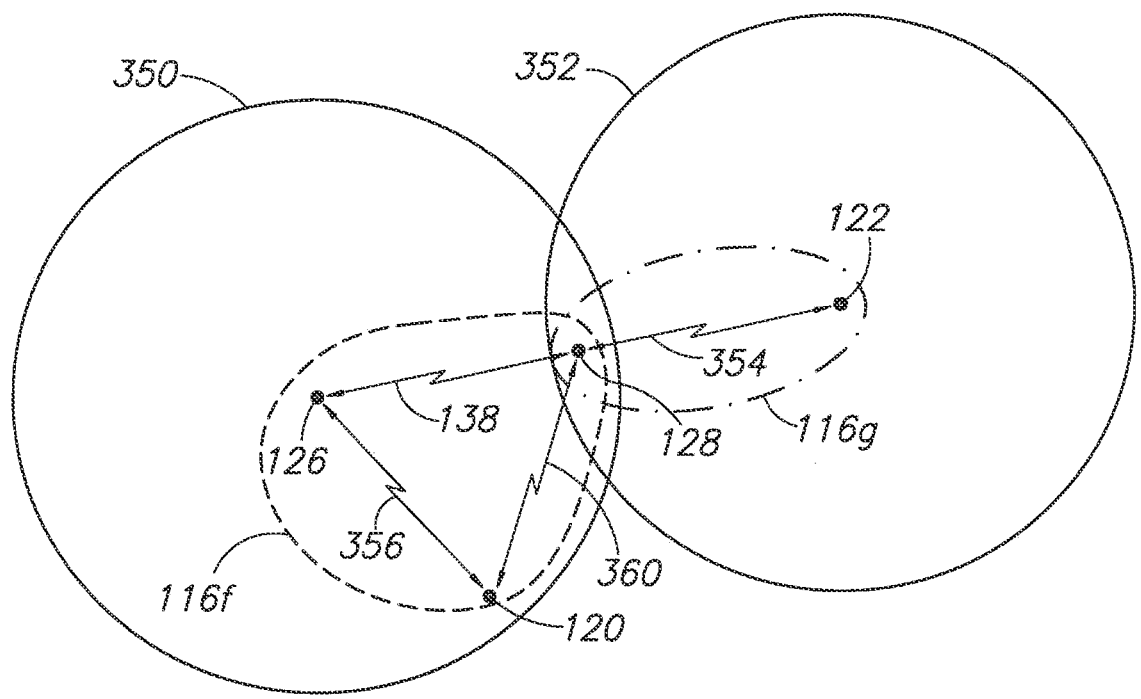
FIG. 8 illustrates the addition of other wireless communication devices to the short-range communication network of FIG. 7.

FIG. 8 illustrates the wireless communication device 122 at the center of a communication range 352. As illustrated in FIG. 8, the wireless communication device 122 comes within range of the wireless communication device 128 (by movement of one or both wireless communication devices). In a process described above, a wireless communication link 354 is established between the wireless communication devices 122 and 128. In one embodiment, the wireless communication devices 122 and 128 form a short range communication network 116g. In this embodiment, the wireless communication device 128 is in both the short-range communication network 116ƒ and 116g. The wireless communication devices 122 and 128 exchange message data in the manner described above. At the end of the message exchange process, the wireless communication devices 122 and 128 will be synchronized. Because the wireless communication device 128 now has updated message data resulting from the synchronization with the wireless communication device 122, the Data Exchange Process (see FIG. 5) between the wireless communication devices 126 and 128 will also occur again. Thus, at the end of this synchronization process, the wireless communication devices 122, 126, and 128 will all have the same message data in the data storage area 184 (see FIG. 2). It should be noted that the data storage area 184 need not be identical between the wireless communication devices 122, 126, and 128 because the messages may appear in a different sequence. However, following synchronization, the data storage area 184 in each of the synchronized wireless communication devices will contain the same messages.

In an alternative embodiment, the wireless communication device 128 acts as a repeater to relay communications such that the wireless communication device 122 is effectively part of the short-range communication network 116ƒ. It should be noted that Direct Messages (i.e., messages intended for a specific recipient) may be passed along a number of different wireless communication devices in a number of different short-range communication networks 116. Security measures, such as encryption, prevent viewing of messages by any wireless communication device (or any access port of router) except the intended recipient.

FIG. 8 also illustrates the wireless communication device 120 coming within range of the wireless communication device 126. As described above, a communication link 356 is established between the wireless communication devices 120 and 126. In addition, if the wireless communication device 128 is within range of the wireless communication device 120, a separate short-range wireless communication link 360 may be established between the wireless communication devices 120 and 128. As described above, when the wireless communication device 120 becomes part of the short-range communication network 116ƒ, data in the data storage area 184 (see FIG. 2) of the wireless communication device 120 is exchanged between the wireless communication device 120 and other wireless communication devices already in the short-range communication network 116ƒ. In the embodiment illustrated in FIG. 8, data may be exchanged between the wireless communication devices 120 and 126 via the wireless communication link 356. Because the wireless communication device 126 now has updated data in the data storage area 184, synchronization will occur between the wireless communication devices 126 and 128. Again, following the synchronization process, the data storage area 184 in the wireless communication devices 120, 126, and 128 will contain the same messages. Because of the new data in the data storage area 184 of the wireless communication device 128, a new synchronization process will occur with the wireless communication device 122. Thus, in a short period of time, all the wireless communication devices in the short-range communication networks 116ƒ-116g are synchronized.

Figure 9:
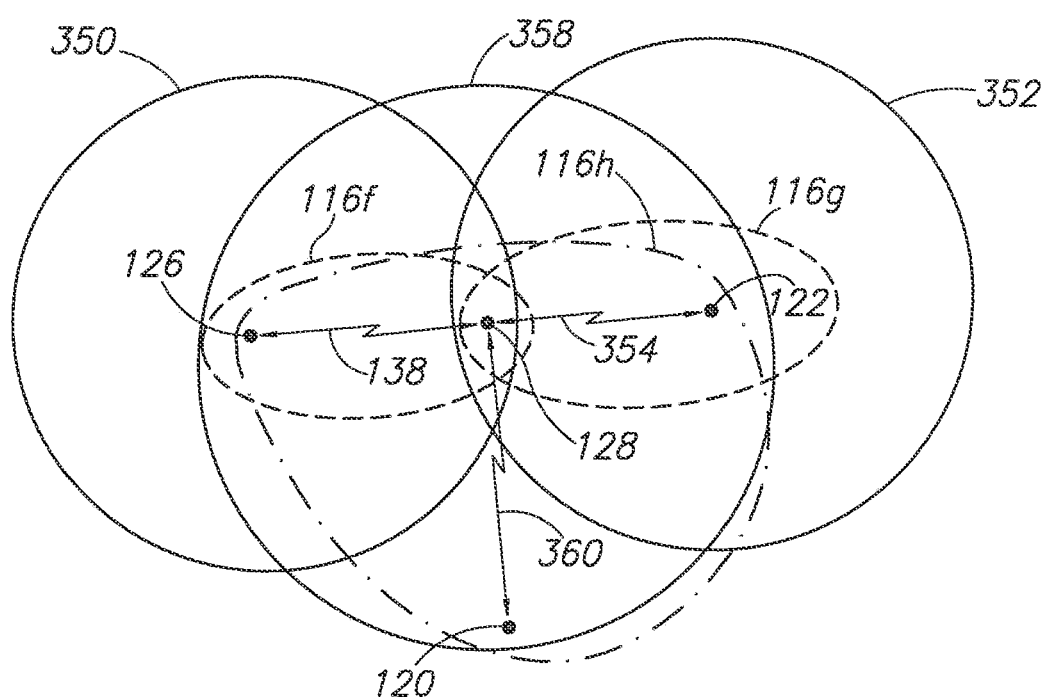
FIG. 9 illustrates a dynamic change to the network configuration of the networks of FIGS. 7-8.

To illustrate the dynamic nature of the short-range communication networks 116, consider FIG. 8 where the wireless communication device 120 now moves out of range of the wireless communication 126, thus eliminating the wireless communication link 356. However, in the embodiment illustrated in FIG. 9, the wireless communication device 128 is illustrated at the center of a communication range 358. As the wireless communication device 120 moves out of the communication range 350, it moves into or remains within a communication range 358 of the wireless communication device 128. As described above, the wireless communication link 360 is established between the wireless communication devices 120 and 128. FIG. 9 illustrates that the short-range communication network 116ƒ now includes only the wireless communication devices 126-128 while the short-range communication network 116g includes only the wireless communication devices 122 and 128. In one embodiment, the wireless communication device 120 may become part of the short-range communication network 116ƒ, or the short-range communication network 116g, or both by using the wireless communication device 128 as a relay. In an alternative embodiment, the wireless communication device 128 may become the group owner of a new short-range communication network 116h that includes the wireless communication devices 120, 122, 126 and 128. In this embodiment, the new short-range communication network 116h eliminates the need for the short-range communication networks 116ƒ and 116g. Thus, the short-range communication networks 116ƒ and 116g would be eliminated.

Figure 10:
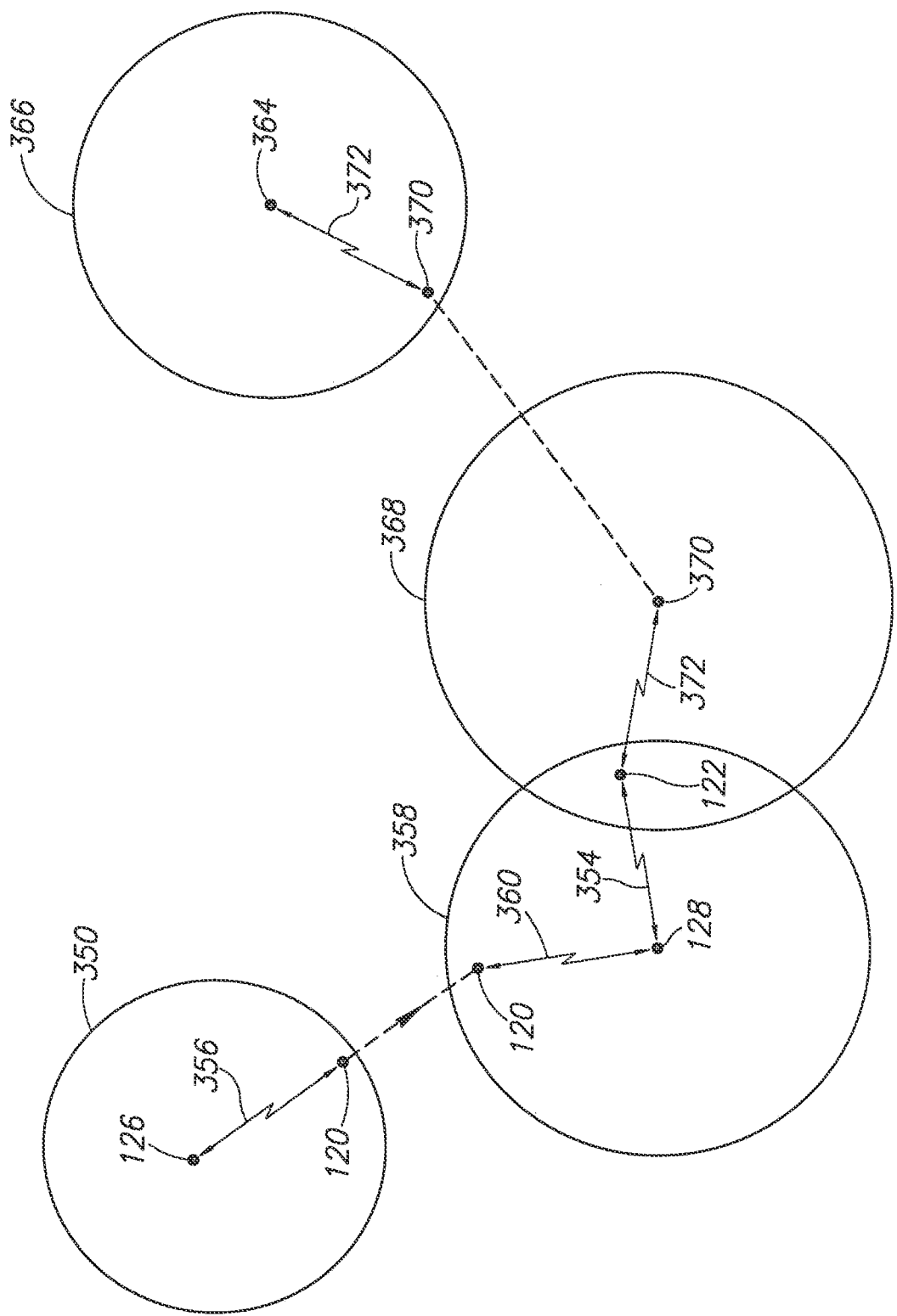
FIG. 10 illustrates the dissemination of information from one short-range communication network to another.

FIG. 10 illustrates a scenario in which wireless communication devices travel from one short-range communication network 116 to another and thereby distribute data stored in the data storage area 184 of the traveling wireless communication device. In FIG. 10, the wireless communication device 126 may generate a message for a wireless communication device 364 having an area of coverage 366 that does not overlap with the communication range 350 of the wireless communication device 126. In the example illustrated in FIG. 10, a message is contained within the data storage area 184 of the wireless communication device 126. The message may have been generated by the wireless communication device 126 or may have been received by the wireless communication device 126 from another wireless communication device (not shown). The wireless communication device 126 uses the wireless communication link 356 to exchange data with the wireless communication device 120. In the example illustrated in FIG. 10, the wireless communication device moves out of the communication range 350 and into the communication range 358 of the wireless communication device 128. In the present example, there may be a period where the wireless communication device 120 is not within range of any short-range communication network 116. However, as the wireless communication device 120 moves within the coverage range 358, it establishes the wireless communication link 360 with the wireless communication device 128 and exchanges data therewith in the manner described above. In turn, the wireless communication device 128 exchanges data, including the data carried by the wireless communication device 120, with the wireless communication device 122 using the wireless communication link 354.

As FIG. 10 illustrates, the wireless communication device 122 is within a communication range 368 of a wireless communication device 370. The wireless communication device 122 exchanges data, including the data originally carried by the wireless communication device 120, to the wireless communication device 370 using a wireless communication link 372. In the example of FIG. 10, the wireless communication device 370 moves out of range of the wireless communication device 122 and out of the communication range 358. At some later point in time, the wireless communication device 370 moves within the communication range 366 of the wireless communication device 364, which is the intended recipient of the message originally stored in the data storage area 184 of the wireless communication device 126. At this point, the wireless communication device 370 establishes a communication link 372 with the wireless communication device 364. At that point, the wireless communication device 370 exchanges data in the data storage area 184 (see FIG. 2) with the wireless communication device 364. As previously discussed, the wireless communication device 370 is carrying the data originated by the wireless communication device 126. This is true even though the wireless communication device 370 may have been out of range of any wireless communication devices for some period of time. Following the data exchange between the wireless communication devices 370 and 364, the wireless communication device 364 now includes the data originally stored in the data storage area 184 of the wireless communication device 126. Thus, it can be appreciated that the dynamic and fluid nature of the short-range communication networks 116 allows data to be exchanged between wireless communication devices that are in range of each other and for data to be carried from one short-range communication network 116 to another.

The example illustrated in FIG. 10 shows only a single wireless communication device 120 moving from the communication range 350 to the wireless communication device 358, the single wireless communication device 370 moving from the area of coverage 368 to the area of coverage 366. However, those skilled in the art will appreciate that this scenario can be repeated by dozens of wireless communication devices. Using the example of a shopping mall, data may be originally exchanged between dozens of wireless communication devices within a single short-range communication network 116. As each of those dozens of wireless communication devices fan out, they temporarily become members of other wireless communication devices and disseminate the data stored in their respective data storage areas 184 to potentially dozens of other wireless communication devices within the new short-range communication network. This form of "viral" distribution can effectively provide a mesh network in areas where there is a large accumulation of wireless communication devices. Thus, the data from the wireless communication device 126 in the example of FIG. 10 may, in fact, be delivered to the wireless communication device 364 through a multitude of pathways.

FIG. 10 illustrates the movement of mobile communication devices from one short-range communication network 116 to another. Those skilled in the art will appreciate that the distances between short-range communication networks 116 may be considerable. Messages could be relayed from one wireless communication device to another and from short-range communication device to another. When a wireless communication device is temporarily out of range of a short-range communication network 116, that wireless device will carry the messages stored in the data storage area 184 (see FIG. 2) until it comes in contact with another short-range communication network. At that point, the message data will be transferred to other wireless communication devices in that short-range communication network 116 and each of those wireless communication devices will carry the message further until it reaches its intended recipient. Thus, a message could be carried a few feet to its intended destination or a few hundred miles to its destination.

When a large number of conventional wireless communication devices are in physical proximity, such as a sporting event or even in rush-hour traffic, a conventional communication network is often overwhelmed because many wireless communication devices are attempting to connect to the same base station. Thus, too many conventional mobile communication devices in proximity can be a debilitating situation. In contrast, the system 100 can actually take advantage of the presence of a large number of wireless communication devices because a large number of devices will facilitate the movement of messages independent of the conventional service provider network. Thus, the system 100 can facilitate rather than debilitate communication in the presence of a large number of mobile communication devices. For example, a message generated by one user in rush-hour traffic will be quickly relayed to many other wireless communication devices in the same rush-hour traffic. Thus, messages may move quickly up and down a roadway. In addition, some of the wireless communication devices will become part of short-range communication networks in other locations near the roadway. Thus, the message spreads up and down the roadway using the wireless communication devices in automobiles on the roadway and moves away from the roadway as automobiles enter and leave short-range communication networks adjacent to or near the roadway. The system 100 could move a message from, by way of example, Orange County to Los Angeles using a variety of short-range communication networks in the manner described above.

As previously discussed, messages may be categorized in several categories, such as Public Messages, Group Messages, Direct Messages, and Status Messages). In addition, a priority category may be created to disseminate emergency messages. The example of FIG. 10 illustrates one embodiment in which an emergency message may be generated by the wireless communication device 126 or received by the wireless communication device 126 from another wireless communication device (not shown). The emergency message can be disseminated to the recipient (e.g., the wireless communication device 364 in FIG. 10) in the manner described above with respect to FIG. 10. One distinction between an emergency message and other message types is that an emergency message will not be deleted from the data storage area of any wireless communication device until "Message Received" confirmation message is received or until some instruction is received to delete the emergency message from the data storage area 184. In this embodiment, the emergency message may be distributed in the same fashion described above with respect to FIG. 10. When the emergency message reaches its intended recipient (e.g., the wireless communication device 364), the recipient wireless communication device generates a message received or message receipt and transmits it back to the originator (e.g., the wireless communication device 126 or wireless communication device not shown). Because of the dynamic nature of the short-range communication networks 116, the Message Received will likely be distributed via a different pathway with a different set of wireless communication devices in different sets of short-range communication networks 116. As the Message Received is distributed, each wireless communication device uses the Message Received to delete the emergency message from the data storage area 184. If a particular wireless communication device never received the emergency message, the Message Received may be ignored. Alternatively, the Message Received message can be delivered via the network 110 (see FIG. 1). For example, the wireless communication device 364 may receive the emergency message and generate the Message Received message for transmission via one or more short-range communication networks 116. Additionally, the wireless communication device 364 may send the Message Received message via the network 110. The Message Received message may be delivered to the network 110 via the access point 140 (see FIG. 3) or via another wireless communication device having network access or via a base station (e.g., the base station 104 of FIG. 1) and a gateway (e.g., the gateway 108 in FIG. 1). The Message Received receipt can be delivered to the originator of the emergency message or delivered to the individual web page 208 or individual JUMMMP web page 202 (see FIG. 3) to notify the message originator that the message has been received.

Figure 11:
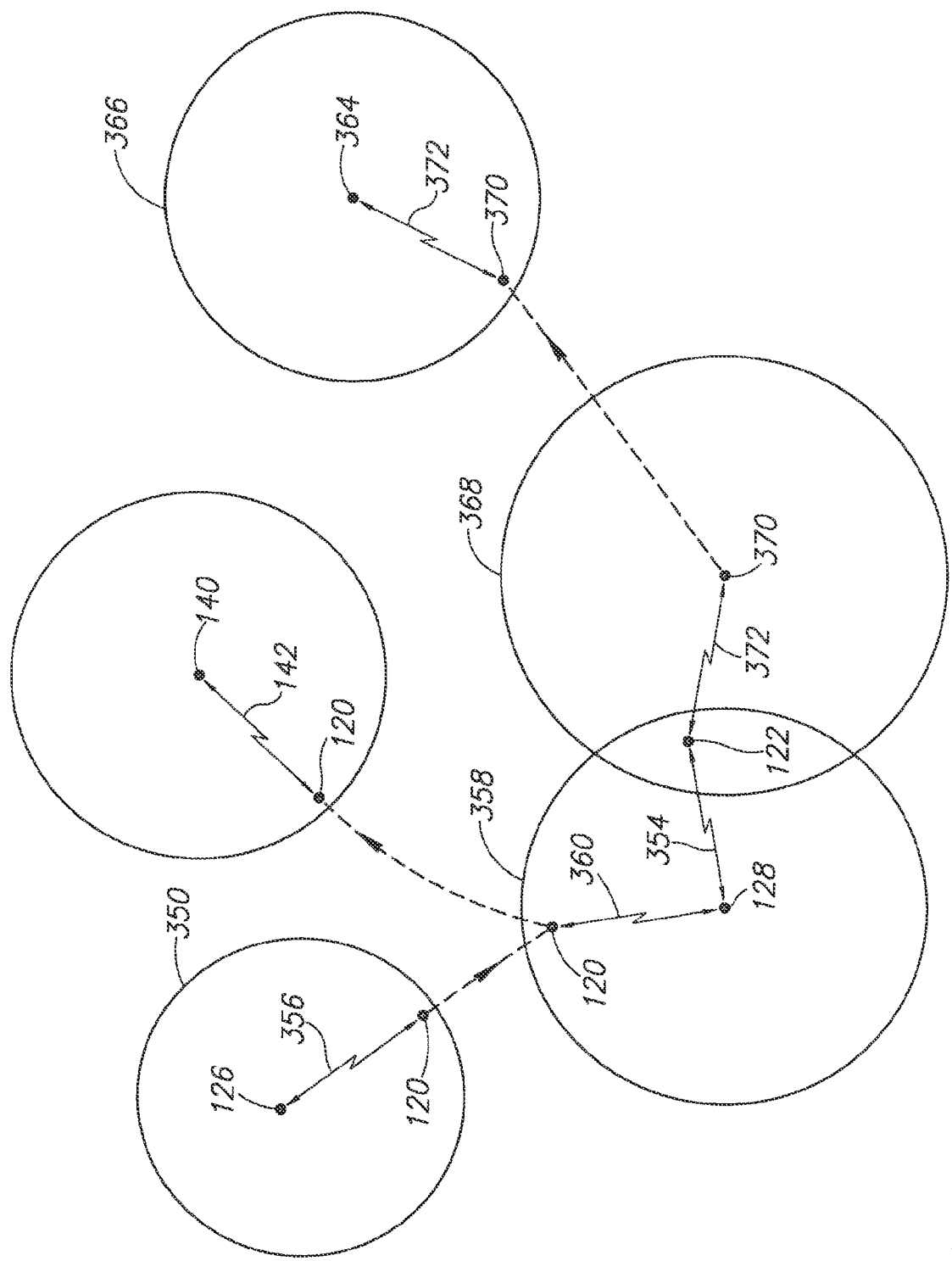
FIG. 11 illustrates the dissemination of information using an access point.

A different emergency message scenario is illustrated in FIG. 11. In this scenario, the system 100 may use the network 110 (see FIG. 1) to further disseminate an emergency message. In FIG. 11, the wireless communication device 120, which has already migrated from the communication area 350 to the communication area 358 now migrates again and comes within range of the access point 140. As described above, the wireless communication link 142 is established between the wireless communication device 120 and the access point 140. In one embodiment, the access point 140 may be part of one or more short-range communication networks 116 and further disseminate the emergency message in a conventional manner. Alternatively, the access point 140 may be a gateway to the network 110 to permit dissemination of the emergency message via the network 110. In this embodiment, the emergency message may require additional headers to identify the recipient. Thus, the wireless access point 140 and network 110 may be used to disseminate the emergency message.

Figure 12:
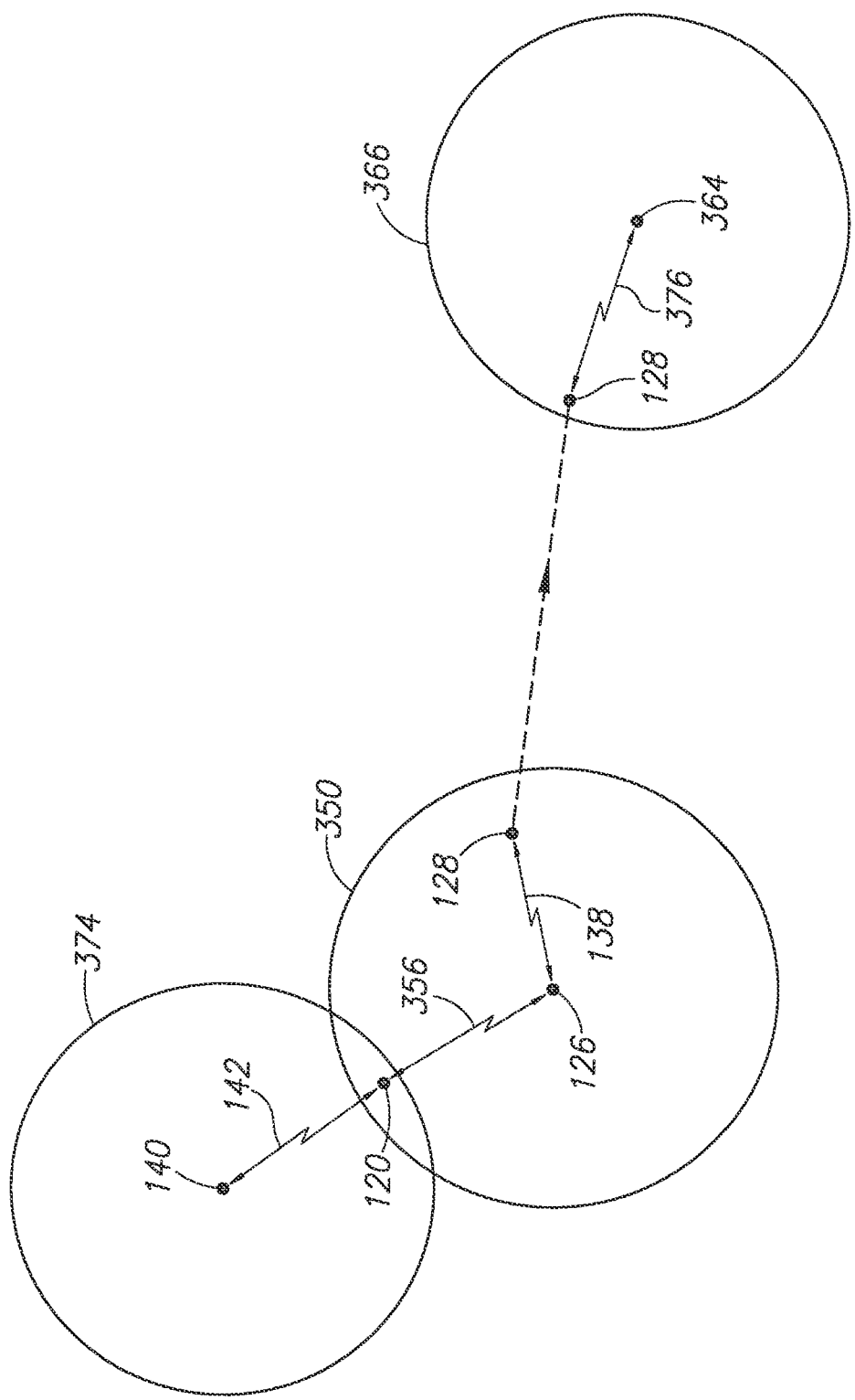
FIG. 12 illustrates the dissemination of information from a retail business.

In another example application of the system 100, a business may utilize the short-range communication networks 116 to disseminate business information in the form of messages, coupons, advertisements, and the like. This is illustrated in FIG. 12 where the access point 140 may be a router or Wi-Fi access point associated with a business. A computing device (not shown) associated with the business transmits the necessary business messages to the router 140. As illustrated in FIG. 12, the wireless communication device 120 is within a coverage range 374 of the access point 140. The business messages are exchanged between the access point 140 and the wireless communication device 120 via the wireless communication link 142. At the same time, the wireless communication device 120 is within the coverage range 350 of the wireless communication device 126 when the business messages are received by the wireless communication device 120, there is a subsequent exchange of data with the wireless communication device 126 via the wireless communication link 356. At the same time, or at some subsequent point in time, the wireless communication device 128 comes within the coverage range 350 and establishes a communication link 138 with the wireless communication device 126. While within the coverage range 350, the wireless communication devices 126-128 will synchronize the data storage areas 184, thereby disseminating the business messages from the wireless communication device 126 to the wireless communication device 128. Broader dissemination through wireless links may be realized in the manner discussed above with respect to FIGS. 10-11. In the example illustrated in FIG. 12, the wireless communication device 128 travels outside the communication range 350. There may be some period of time where the wireless communication device 128 is not within the coverage range of any other wireless communication devices. At some point in time, the wireless communication device 128 travels within the area of coverage 366 as the wireless communication device 364. A wireless communication link 376 is established there between. The wireless communication devices 128 and 364 exchange data from the data storage area 184 of each device. In this manner, the original business messages are delivered to the wireless communication device 364. Thus, the business messages may be disseminated quickly by a large number of wireless communication devices (not shown) within the short-range communication networks 116. In addition, wireless communication devices, such as the wireless communication device 128 may be physically carried out of communication range of any other wireless communication device and, when connections are reestablished with another wireless communication device, the business messages are disseminated.

In another alternative embodiment, the user of a wireless communication device 120 may express personal preferences for shopping. For example, the user of the wireless communication device 120 in FIG. 12 may be interested in men's clothing. The preferences are broadcast by the wireless communication device 120 to the access point 140. The preference may include not only the general preference for men's clothing, but other options, such as particular items of clothing, sizes of clothing, colors, and the like. In this example, the access point 140 relays the customer preference data to a computer (not shown). The computer compares customer preferences with available stock or preference for sale items, and the like and returns that information to the access point 140. The access point 140 exchanges data in the data storage area 184 with the data in the data storage area 184 of the wireless communication device 120. In this manner, the wireless communication device 120 receives data relating specifically to the user's preferences.

Those skilled in the art will appreciate that other user preferences may be supplied in the form of a user preference profile. In this embodiment, the profile may include information, such as age, business and recreational interests, and the like. Based on the preference profile, the access point 140 can provide business messages customized for an individual user.

The system 100 described above exchanges messages between a number of wireless communication devices. In the example of a shopping mall, there may be hundreds of messages generated that are distributed through hundreds of other phones. Those skilled in the art will appreciate that such a large potential cache of messages requires message management. In one embodiment, the controller 182 (see FIG. 2) manages the data storage area 184 by eliminating the oldest messages as new messages are received that exceed some threshold storage level. For example, the data storage area 184 may have a certain capacity. However, it may be desirable to reserve at least a portion of that capacity for emergency messages, status messages, and the like. Therefore, a threshold, which may be a percentage of the total storage capacity of the data storage area 184 can be set by the user of the individual wireless communication device or set system-wide as part of the JUMMMP API. When the threshold is exceeded, the controller 182 begins to delete the oldest messages first. In another alternative embodiment, messages may be deleted on the basis of message type. For example, business messages may have a lower priority and be deleted first. In contrast, emergency messages may not be deleted until a specific instruction is received to delete the emergency message or until a Message Read Receipt is received. Message management in a very large network may be handled on the basis of a number of parameters, including, but not limited to:

1. personal preferences;
2. personal profile;
3. message transfer to an external data structure via, by way of example, the network 110 using either WiFi and/or a conventional wireless communication link (e.g., 3G, 4G, LTE, or the like);
4. message pruning;
5. management of different group connections based on movement in and out of the groups; and
6. overall message management based on other parameters of multiple short-range communication networks 116.

Other message management techniques may also be used.

Those skilled in the art will appreciate that the memory capacity of wireless communication devices generally increases significantly with each new model or generation of devices introduced to the public. Although the description herein has focused on text messages, increases in storage capacity of the data storage area 184 may allow the dissemination of voice messages or even video messages. The message dissemination occurs in the manner described above. It is only the type of message that differs in this scenario. One advantage of the system 100 is that messages can be delivered even if the recipient wireless communication device is not powered or is temporarily out of range of any other wireless communication devices. This feature is advantageous in an emergency situation. For example, firefighters typically use cellular communication devices with a PTT technology that allows any one firefighter to push the button and talk to other firefighters in a designated communication group. However, if one or more firefighters are temporarily out of range of the transmitting PTT device, those firefighters will not receive the broadcast. In contrast, the system 100 can disseminate voice messages throughout all group members. Thus, a firefighter that was temporarily out of communication will resynchronize the data storage area 184 upon reconnection to any of the wireless communication devices within the firefighter group and thereby receive the original message.

The preceding material has discussed the dynamic nature of the short-range communication network 116. With reference to those figures and additional figures, network formation and network management may now be discussed in greater detail.

With reference to FIG. 1, the base station 104 is part of a mobile network and is controlled by the BSC 106. The BSC 106 may control other base stations (not shown). In turn, the BSC 106 is controlled by other network management elements. Ultimately, a large public land mobile network (PLMN) is controlled by regional or national control elements (not shown). Thus, the PLMN has a hierarchical network management system with area control elements, regional control elements and national control elements.

Because of the ad-hoc nature of the short-range communication network 116, central network control elements are not practical. Instead, each wireless communication device (e.g., the wireless communication device 120) must provide a certain degree of network management control. In addition, the wireless communication devices within a single short-range communication network (e.g. the short-range communication network 116e of FIG. 4) can provide network management for that small short-range communication network. Thus, the system 100 does not have a large centralized network management element, as is typical in wireless communication networks.

Figure 13:
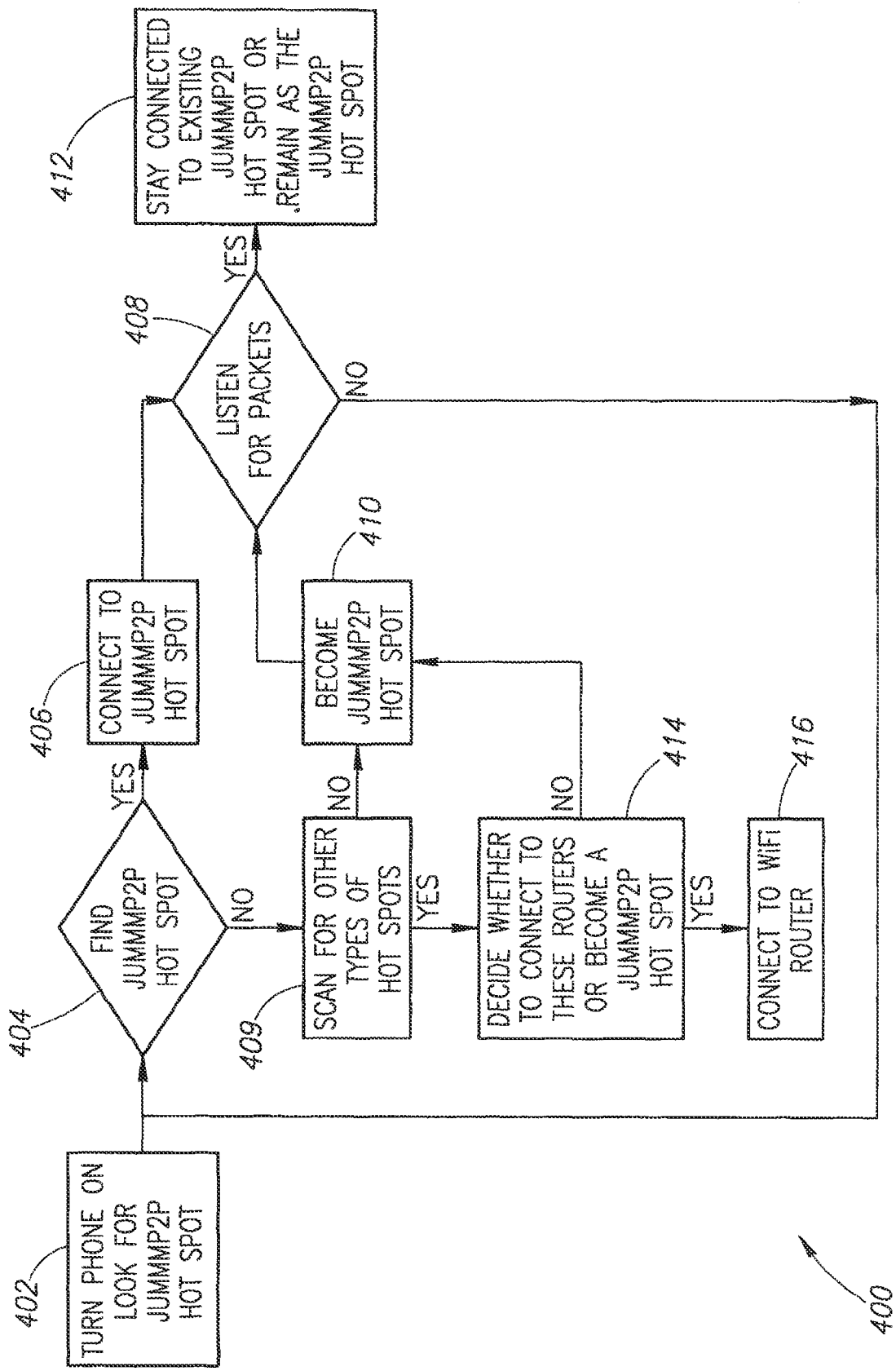
FIG. 13 is a flowchart illustrating the operation of wireless communication device in the dynamic formation of short-range communication networks.

FIG. 13 illustrates a flow chart 400 illustrating an exemplary embodiment of self-management by individual ones of the wireless communication devices (e.g., the wireless communication device 120). At step 402, the user turns on or otherwise enables the short-range transceiver 176 (see FIG. 2) and the wireless communication device searches for a hot spot. Those skilled in the art will appreciate that the term "hot spot" may typically refer to the access point 140. However, in the present embodiment, a hot spot refers to any wireless device (e.g. the access point 140 or any wireless communication device) that is configured to broadcast a beacon signal identifying the device as available for communication with other wireless communication devices. In the example described above, a wireless hot spot is configured to transmit a beacon signal containing the SSID "JUMMMP." In this exemplary embodiment, the wireless communication device searches for a hot spot transmitting the SSID "JUMMMP."

In decision 404, the wireless communication device (e.g. the wireless communication device 120) determines whether it has discovered a JUMMMP hot spot. If the wireless communication device has discovered a JUMMMP hot spot, the result of decision 406 is YES and, in step 406, the wireless communication device connects to the discovered hot spot.

In decision 408, the wireless communication device listens for data packets to determine whether any data packets are available from the discovered hot spot. If data packets, such as messages, are available from the discovered hot spot, the result of decision 408 is YES and, messages are exchanged between the wireless communication device and the hot spot. An example data exchange process is described above with respect to FIG. 5.

Returning to decision 404, if the wireless communication device (e.g. the wireless communication device 120) is unable to detect a JUMMMP hot spot, the result of decision 404 is NO and, in decision 409, the wireless communication device scans for other types of hot spots other than a JUMMMP hot spot. If no other type of hot spot is available, the result of decision 409 is NO, and in step 410, the wireless communication device itself becomes a hot spot. In operation, the wireless communication device is configured to transmit a beacon signal and will serve as a hot spot for other nearby wireless communication devices. In the example presented herein, the wireless communication device that becomes a hot spot will transmit a beacon signal with the SSID JUMMMP.

Following step 410, the wireless communication device/hot spot also listens for data packets in decision 408. In this implementation of decision 408, the wireless communication device/hot spot is listening to detect other wireless communication devices that may attach thereto. When another wireless communication device (e.g. the wireless communication device 122 in FIG. 4) detects the wireless communication device/hot spot, it will establish a communication link therewith and exchange messages. If data packets are to be exchanged, the result of decision 408 is YES.

In an exemplary embodiment, the wireless communication devices will continue to operate as the short-range communication network 116 so long as the wireless communication devices are connected to a hot spot. As discussed above, the hot spot may be a router, wireless access point, or another one of the wireless communication devices. In step 412, the wireless communication device will stay connected to the existing JUMMMP hot spot or will remain as the JUMMMP hot spot so long as other devices are connected therewith to form the short-range communication network 116.

In an alternative embodiment, the controller 182 (see FIG. 2) may include a timing element that will cause the wireless communication device (e.g., the wireless communication device 120) connected to a hot spot to periodically disconnect from that hot spot and scan for other JUMMMP hot spots even if the result of decision 408 is YES. If another JUMMMP hot spot is discovered by the wireless communication device as a result of implementation of this search, the wireless communication device can execute step 406 to connect to the new JUMMMP hot spot. The wireless communication device will execute other steps as described above with the new hot spot to exchange data (e.g., messages) and to synchronize the data storage area 184 of each wireless communication device within the particular short-range communication network 116.

Returning to decision 408, if no data packets or messages are detected by the wireless communication device connected to a JUMMMP hot spot, the result of decision 408 is NO. In that event, the wireless communication device ceases communication with that hot spot and scans for a different JUMMMP hot spot in decision 404. If a different JUMMMP hot spot is detected, the result of decision 404 is YES and the system 100 returns to step 406 to connect to the newly discovered JUMMMP hot spot and will exchange messages therewith in the manner previously described.

Returning to decision 409, if the wireless communication device detects other types of hot spots, the result of decision 409 is YES. In that case, the wireless communication device moves to decision 414 to determine whether to connect to the non-JUMMMP hot spot or to become a JUMMMP hot spot. The wireless communication device may elect to connect to a non-JUMMMP hot spot in order to gain access to a router or other gateway device. If the wireless communication device decides to connect to the non-JUMMMP hot spot, the result of decision 414 is YES and, in step 416, the wireless communication device connects to the WiFi router or other device, such as a wireless modem or other access point. If the wireless communication device decides not to connect to the non-JUMMMP hot spot, the result of decision 414 is NO and the wireless communication device becomes a JUMMMP hot spot in step 410.

Thus, a wireless communication device in the embodiment of FIG. 13 will remain connected to a JUMMMP hot spot so long as they remain within range of each other and continue to exchange data. Even though it may be connected to a JUMMMP hot spot, a different wireless communication device will disconnect and scan for other JUMMMP hot spots if no data is being received from the present JUMMMP hot spot or may periodically disconnect from the present JUMMMP hot spot to search for other nearby JUMMMP hot spots. Furthermore, those skilled in the art will appreciate that mobile devices may change location. A user may be temporarily stationary or may be walking or riding in a vehicle. Thus, wireless communication devices may move in and out of range of a JUMMMP hot spot on a relatively frequent basis. Similarly, a wireless communication device serving as the JUMMMP hot spot may itself be mobile and move out of range of other wireless communication devices within the dynamically formed short-range wireless communication network. Thus, each wireless communication device manages its own activities and can connect or disconnect from JUMMMP hot spots or, in the absence of another JUMMMP hot spot, may be configured to become a JUMMMP hot spot so that others may connect to it.

During the operational set-up of a short-range communication network 116, the designated hot spot (e.g., the access point 140 or any wireless communication device, such as one of the wireless communication devices 120-128) transmits the designated SSID, as described above. The hot spot device assigns a MAC address to each wireless communication device attempting to connect to the hot spot. In an exemplary embodiment, each of the wireless communication devices within a particular short-range communication network 116 is assigned the same MAC address. This will permit the free exchange of communications among the wireless communication devices of the short-range communication network 116.

As discussed above, a new wireless communication device that discovers a hot spot will associate with that hot spot and exchange data messages, as illustrated in FIG. 5. However, wireless communication devices within a short-range communication network can exchange messages directly. For example, FIG. 8 illustrates the wireless communication device 126, which may serve as the group owner or hot spot for the short-range communication network 116*f*. In one embodiment, the wireless communication devices 120 and 128 may exchange message data via the wireless communication device 126. However, the wireless communication devices 120 and 128 may also exchange messages directly with each other via the wireless communication link 360. This is true even if the wireless communication device 126 moves out of range of the wireless communication devices 120 and 128 or is powered down. Even if the group owner or hot spot disappears, wireless communication devices 120 and 128 can still communicate with each other as part of the short-range communication network 116*f*. Thus, the hotspot 126 is only necessary to initiate formation of the short-range communication network 116*f*. If the hot spot 126 disappears, the short-range communication network 116*f* will continue to operate, but will not be detected by other nearby wireless communication devices because no communication device in the short-range communication network 116*f* is broadcasting the SSID JUMMMP. Alternatively, the short-range communication network 116*f* may merge into the short-range communication network 116*g*.

In yet another alternative embodiment, the wireless communication device 128 effectively links together the short-range communication networks 116*f*-116*g*. That is, all messages in the data storage area at 184 (see FIG. 2) of the wireless communication devices 120 and 126 will be provided to the wireless communication device 128 during the synchronization process described above. In turn, the wireless communication device 128 will synchronize its data storage area 184 with the data storage area 184 of the wireless communication device 122. Thus, the wireless communication device 128 effectively bridges the wireless communication devices 120, 122, and 126 thereby creating a single larger short-range communication network 116 out of the smaller short-range communications networks 116*f* and 116*g*.

Although FIG. 8 illustrates only a small number of wireless communication devices within the short-range communication network 116*f*, those skilled in the art will appreciate that the principles described herein can be extended to a greater number of wireless communication devices. Thus, many wireless communication devices within a short-range communication network 116 can continue to communicate with each other and maintain the short-range communication network 116 even if the group owner subsequently disappears (by moving out of range or powering down the device).

In the embodiment described above, there must be at least one hot spot (i.e., a group owner) to initiate the formation of a short-range communication network 116. In a sparsely populated area (i.e., very few wireless communication devices) it is possible that two wireless communication devices are turned on and are not within range of any other wireless communication devices, including each other. In such a scenario, each wireless communication device would become a hot spot. Because a hot spot is transmitting the SSID, it is not receiving and searching for other hot spots. In this rare situation, it is possible that the two wireless communication devices would come within range of each other, but not detect each other because they are both hot spots. In a variation to the flowchart of FIG. 13, if a wireless communication device becomes a hot spot (by executing step 410 in FIG. 13) and is undetected by any other wireless communication devices, it can periodically terminate the transmission of the beacon signal and become a normal wireless communication device searching for a hot spot. The transition from a hot spot to a conventional wireless communication device may be done periodically for a short period of time. In this manner, one wireless communication device would likely be a hot spot during the period of time in which the other wireless communication device is searching for hot spots. Thus, even in a sparse population, the two wireless communication devices would ultimately detect each other and form the short-range wireless communication network 116.

Figure 14:
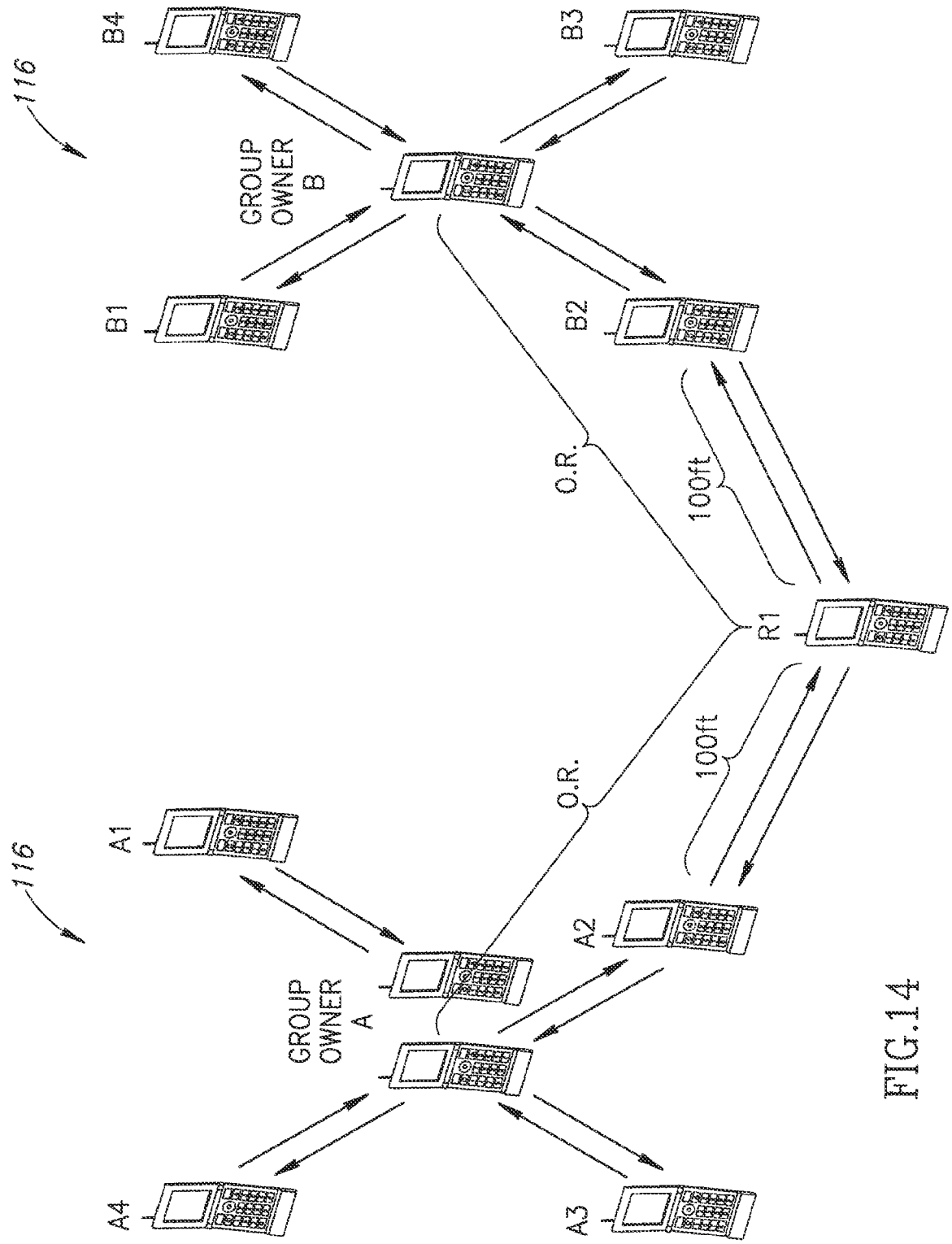
FIG. 14 illustrates the dynamic formation of short-range communication networks.

FIG. 14 illustrates other scenarios in which wireless communication devices detect hot spots or become hot spots to facilitate the formation of short-range wireless communication networks 116. In FIG. 14, there are two distinct short-range wireless communication networks 116, designated as Group A, and Group B. Group A has a Group Owner A, which serves as the hot spot and, in the example of FIG. 14, includes phones A1-A4. The wireless communication devices A1-A4 are considered peers and may communicate with each other, if in range, or communicate via the Group Owner A. Similarly, Group B includes Group Owner B and wireless communication devices B1-B4. The wireless communication devices B1-B4 are operating as peer devices and may communicate directly with each other, if in range, or communicate via the Group Owner B.

FIG. 14 illustrates the group owners (i.e., Group Owner A and Group Owner B) at the center of each respective short-range communication network 116 to illustrate the potential range of a network. However, once the peer wireless communication devices become part of a short-range communication network 116, they can freely communicate directly with other peer wireless communication devices of that network or any other short-range communication network with which they come into range. For example, the peer wireless communication devices A1 and A4 may communicate directly with each other if they move into communication range of each other.

In FIG. 14, a new wireless communication device, designated as R1, is out of range of Group Owner A and Group Owner B, but comes within range of the peer wireless communication device A2 and the peer wireless communication device B2. In accordance with the flowchart of FIG. 13, the wireless communication device R1 searches for hot spots. The wireless communication device R1 cannot communicate with either the network A or network B because it is out of range (indicated by the designation O.R.) of the hot spot (i.e., Group Owner A and Group Owner B) and therefore will not detect the transmitted SSID from the group owners. Because the wireless communication devices A2 and B2 are not hot spots, the wireless communication device R1 will be unsuccessful in locating a short-range communication network 116. In executing step 410 (see FIG. 13) the wireless communication device R1 will become a hot spot. While the wireless communication devices A2 and B2 are peers within their respective networks, they may still periodically scan for other hot spots (see step 409 in FIG. 13). When the peer wireless communication devices A2 and B2 search for other hot spots, they will detect the newly created hot spot of wireless communication device R1. As soon as the wireless communication devices A2 and B2 detect the new hot spot provided by the wireless communication device R1, the wireless communication devices R1, A2, and B2 will synchronize, as illustrated in FIG. 5. The presence of the new hot spot provided by the wireless communication device R1 effectively links together both network A and network B using the wireless communication devices A2 and B2, respectively, as bridges. Thus, all of the phones in Network A and Network B are bridged together to form a larger short-range wireless communication network. The wireless communication devices in Network A and Network B, as well as the wireless communication device R1, will all be synchronized and have exchanged messages, as illustrated in the flowchart of FIG. 5.

In the scenario of FIG. 14, network A and network B are connected together via the wireless communication device R1 with the wireless communication device R1 effectively acting as a relay between the wireless communication devices A2 and B2. However, as the wireless communication devices in the network A and the network B move around, they may come into range of each other and can therefore communicate directly with each other. For example, the peer wireless communication devices A1 and B1 in FIG. 13 may move within range of each other thus allowing direct communication between these devices.

Furthermore, those skilled in the art will appreciate that if the wireless communication device R1 came within range of only one of the peer wireless communication devices A2 and B2, the wireless communication device R1 would become a hot spot and be detected by the peer device of only one of the networks. For example, if the wireless communication device R1 became a hot spot and came within range of the wireless communication device B2, the wireless communication device B2 would act as a bridge or relay between the wireless communication device R1 and the wireless communication devices of Network B.

Figure 15:
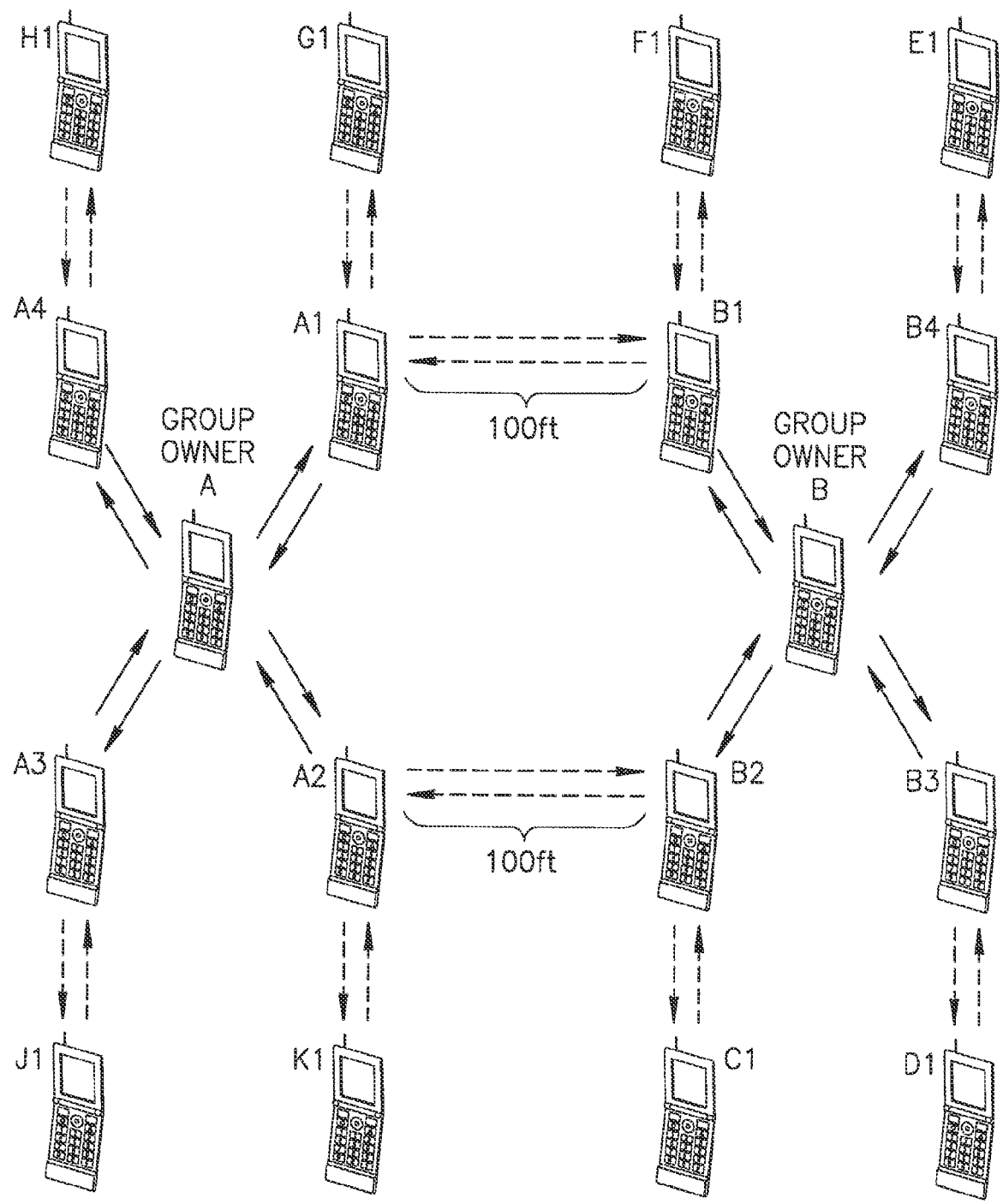
FIG. 15 illustrates further dynamic formation of short-range communication networks.

FIG. 15 illustrates a logical extension of the principles discussed with respect to FIG. 14. In the example of FIG. 15, each of the peer devices (A1-A4 of Network A and B1-B4 of Network B) searches for and connects with other hot spots (i.e., the hot spots provided by wireless communication devices C1-K1). The wireless communication devices C1-K1 may be the group owners of their respective smaller short-range wireless communication networks 116 or may be peer devices in other short-range wireless communication networks that periodically become hot spots to search for other wireless communication devices. Although not illustrated in FIG. 15, those skilled in the art will appreciate that the hot spot wireless communication devices C1-K1 may have other peer devices (not shown) connected to that hot spot thus greatly expanding the overall reach of the short-range communication network 116.

As noted above, the wireless hot spot/group owner assigns the same MAC address to those wireless communication devices that detect the SSID beacon (e.g., SSID JUMMMP). In yet another alternative embodiment, the requirement of a group owner to initiate formation of a short-range communication network 116 can be eliminated. A program designed in accordance with the present teachings can be executed and utilize a predetermined channel SSID, iprange, port, and MAC address associated with the JUMMMP functionality. A wireless communication device can simply broadcast a greeting message; if it is detected by another nearby wireless communication device, the other device can transmit its own messages thereby synchronizing the data storage area 184 (see FIG. 3) of each device. In this manner a completely de-centralized short-range communication network can be formed. The wireless communication devices detect the presence of other nearby devices by virtue of the fact that they respond to the transmission of the greeting message.

Thus, it can be appreciated that the wireless communication system described herein provides a highly dynamic network in which a large number of wireless communication devices may be coupled together in a dynamic fashion to create a large number of short-range communication networks 116 and to permit individual users to come and go from any particular short-range communication network.

While the system has been described herein with respect to Wi-Fi (i.e., IEEE 802.11), other short-range communication devices, such as Zigbee, or the like may be satisfactorily employed with the system 100.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for network management of wireless communication devices using an application program interface (API) operating as part of the operating system of the respective wireless communication devices, comprising:

in a first wireless communication device having a message storage area containing one or more stored messages, monitoring a predetermined radio frequency channel with a receiver to detect a beacon signal, having a predetermined beacon identifier, from a second wireless communication device having a message storage area containing one or more stored messages;

if the beacon signal having the predetermined beacon identifier is detected, the API using a transmitter and the receiver in the first wireless communication device to automatically establish a first communication link between the first wireless communication device and the second wireless communication device to thereby form a first wireless group;

upon formation of the first wireless group, transmitting the stored messages from the first wireless communication device to the second wireless communication device and receiving the stored message data from the second wireless communication device such that the message storage areas of the first and second wireless communication devices are synchronized;

in a third wireless communication device having a message storage area containing one or more stored messages, monitoring the predetermined radio frequency channel with a receiver to detect the beacon signal having a predetermined beacon identifier from the second wireless communication device;

if the beacon signal having the predetermined beacon identifier is detected, the API using a transmitter and the receiver in the third wireless communication device to automatically establish a second communication link between the third wireless communication device and the second wireless communication device to thereby add the third wireless communication device to the first wireless group;

upon the addition of the third wireless communication device to the first wireless group, transmitting stored messages from the third wireless communication device to other wireless communication devices in the first wireless group and receiving message data from other wireless communication devices in the first wireless group such that the message storage areas of the first, second, and third wireless communication devices, respectively, are synchronized;

if the beacon signal having the predetermined beacon identifier is not detected, using the transmitter in the first wireless communication device to transmit the beacon signal having the predetermined beacon identifier;

using the receiver to receive a signal from a fourth wireless communication device having a message storage area containing one or more stored messages, that has detected the beacon signal transmitted from the first wireless communication device;

using the transmitter and receiver in the first wireless communication device to establish a third communication link between the first wireless communication device and the fourth wireless communication device to thereby form a second wireless group; and upon formation of the second wireless group, transmitting the stored messages from the first wireless communication device to the fourth wireless communication device and receiving the stored messages from the fourth wireless communication device such that the message storage areas of the first and fourth wireless communication devices are synchronized.

2. The method of claim 1 wherein one or more messages include time data indicative of a transmission time of the message and location data indicative of a location from which the message originated.

3. The method of claim 1 wherein the messages comprise a data file.

4. The method of claim 3 wherein the data file comprises a data file having a data form selected from a plurality of data forms comprising audio data, video data, image data, and document data.

5. The method of claim 3 wherein the data file has a PDF image data form.

6. The method of claim 3 wherein the data file has a word processor document data form.

7. The method of claim 3 wherein the data file has an audio document data form and transmitting audio data comprises providing a push-to-talk button on the first wireless communication device to permit a user to speak into an audio input device on the first wireless communication device.

8. The method of claim 3 wherein the messages transmitted from the first wireless communication device to the second wireless communication device comprises a message intended for a specified recipient.

9. The method of claim 8 wherein the message is intended for a specified recipient other than the second wireless communication device, the method further comprising the second wireless communication device transmitting the message during synchronized with other wireless communication devices until the intended recipient receives the message.

10. The method of claim 3 wherein the message data transmitted from the first wireless communication device to the second wireless communication device comprises a message intended for any recipient.

11. The method of claim 1 wherein the wireless communication device transmitting the beacon signal is designated as a group owner.

12. The method of claim 11 wherein the wireless communication device detecting the beacon signal is designated as a group client.

13. The method of claim 12, further comprising the group owner storing a list of group clients having wireless communication links with the group owner.

14. The method of claim 1 wherein the second wireless communication device is a wireless access point.

15. The method of claim 14 wherein the wireless access point is designated as a group owner.

16. The method of claim 15, further comprising the group owner transmitting data indicative of a number of group clients coupled to the group owner via wireless communication links.

17. The method of claim 1 wherein the transmitter and receiver in the first wireless communication device operate in accordance with WiFi standards.

18. The method of claim 1 wherein the first and second wireless communication devices are cell phone devices having network transceivers for communication with a public land mobile network (PLMN) and wherein the transmitter and receiver in the first wireless communication device are non-network communication devices not used with the PLMN.

19. The method of claim 1 wherein the first wireless communication device detected the beacon signal from the second wireless device, the method further comprising:
in the third wireless communication device, monitoring the predetermined radio frequency channel with a receiver to detect the beacon signal having a predetermined beacon identifier from the second wireless communication device;
if the beacon signal having the predetermined beacon identifier is not detected, using the transmitter in the third wireless communication device to transmit the beacon signal having the predetermined beacon identifier;
breaking the first communication link;
in the first wireless communication device, monitoring the predetermined radio frequency channel with the receiver to detect the beacon signal having the predetermined beacon identifier from the third wireless communication device;
if the beacon signal having the predetermined beacon identifier from the third wireless communication device is detected,
the API using the transmitter and receiver in the first wireless communication device to automatically establish a fourth communication link between the first wireless communication device and the third wireless communication device to thereby form a third wireless group; and
upon formation of the third wireless group, transmitting the stored messages from the first wireless communication device to the third wireless communication device and receiving the stored messages from the third wireless communication device such that the message storage areas of the first and third wireless communication devices are synchronized.

20. The method of claim 19 wherein breaking the first wireless communication link comprises determining a signal quality indicator of the first communication link and breaking the first communication link if the signal quality indicator is less than a threshold value.

21. The method of claim 19 wherein breaking the first wireless communication link comprises periodically breaking the first wireless communication link.

22. The method of claim 19, further comprising:
breaking the fourth communication link between the first wireless communication device and the third wireless communication device:
re-establishing the first communication link between the first wireless communication device and the second wireless communication device to thereby rejoin the first wireless group; and
upon rejoining the first wireless group, transmitting the stored messages from the first wireless communication device to the second wireless communication device and receiving the stored messages from the second wireless communication device, wherein the second wireless communication device thereby receives the messages received by the first wireless communication device from the third wireless communication device while the first wireless communication device was in the third wireless group such that the message storage areas of the first and second wireless communication devices are synchronized.

23. The method of claim 22 wherein breaking the first communication link, establishing the fourth wireless communication link between the first wireless communication device and the third wireless communication device, transmitting message data from the first wireless communication device to the third wireless communication device and receiving message data from the third wireless communication device, breaking the fourth communication link, re-establishing the first communication link between the first wireless communication device and the second wireless communication device, transmitting message data from the first wireless communication device to the second wireless communication device and receiving message data from the second wireless communication device is performed periodically and repeatedly whereby the first wireless communication device is a member of the first wireless group and the third wireless group.

24. The method of claim 1, further comprising the fourth wireless communication device merging the message data received from the first wireless communication device with message data already stored in the fourth wireless communication device and transmitting the merged message data from the fourth wireless communication device, wherein receiving message data from the fourth wireless communication device comprises receiving the merged message data.

25. A system for network management of a plurality of wireless communication devices comprising:
the plurality of first wireless devices each having:
a transmitter;
a receiver;
a data storage area configured to store message data including one or more messages; and
a controller configured to control operation of the respective wireless device, the respective receivers being configured to detect a transmitted beacon signal having a selected beacon identifier, with the respective transmitters being configured to automatically establish respective communication links with one of the plurality of wireless devices whose beacon signal is detected by the respective receivers;
wherein at least two of the plurality of wireless communication devices detect the beacon signal and establish communication links with one of the plurality of wireless devices whose beacon signal is detected to thereby form a first wireless group containing at least three wireless communication devices; and
wherein the respective controllers of wireless communication devices in the first wireless group are further configured to synchronize message data in the data storage areas of all wireless communication devices in the first wireless group wherein the messages have a designated recipient selected from a group of recipients consisting of a designated individual, a designated user group, and a designated public message and wherein each of the wireless communication devices in the first wireless group processes any designated public message for use by a user of each respective wireless communication device, and a wireless communication devices in the first wireless group will process any designated user group messages for use by the user of respective ones of the wireless communication devices only in the respsctive wireless communication device is a member of the designated user group for a particular message having a designated user group, and only a single selected wireless communication device identified as a recipient for a designated individual message will processes the message for a user of the single selected wireless communication device.

26. The system of claim 25 wherein the message data comprises a data file.

27. The system of claim 26 wherein the data file comprises a data file having a data form selected from a plurality of data forms comprising audio data, video data, image data, and document data.

28. The system of claim 25 wherein if no beacon signal is detected by the respective receivers, the controller of one of the plurality of wireless communications devices unable to detect the beacon signal is further configured to cause the transmitter of that wireless communication device to transmit the beacon signal having the selected beacon identifier.

29. The system of claim 25 wherein the respective controllers of the wireless communication devices are further configured to merge message data received from others of the wireless communication devices in the first wireless group with message data already stored in the respective wireless communication devices, and the synchronization comprises transmitting the merged message data from the respective wireless communication devices to others of the wireless communication devices in the first wireless group.

30. The system of claim 25 wherein each of the respective controllers of the wireless communication devices in the first wireless group are further configured to receive and store messages received from others of the wireless communication devices in the first wireless group during synchronization even if the messages are not intended for the respective wireless communication device.

31. The system of claim 25 wherein each of the respective controllers of the wireless communication devices in the first wireless group are further configured to transmit stored messages stored in the data storage area of the respective wireless communication devices to others of the wireless communication devices in the first wireless group during synchronization even if the messages are not intended for the respective wireless communication devices to which the stored messages are transmitted.

* * * * *